(12) United States Patent
Gunderson

(10) Patent No.: US 7,600,193 B2
(45) Date of Patent: Oct. 6, 2009

(54) METHOD OF TRACKING DUAL MODE DATA OBJECTS USING RELATED THUMBNAILS AND TOOL ICONS IN A PALETTE WINDOW

(75) Inventor: Benjamin Gunderson, Simi Valley, CA (US)

(73) Assignee: Bluebeam Software, Inc., Pasadena, CA (US)

( * ) Notice: Subject to any disclaimer, the term of this patent is extended or adjusted under 35 U.S.C. 154(b) by 351 days.

(21) Appl. No.: 11/287,409

(22) Filed: Nov. 23, 2005

(65) Prior Publication Data

US 2007/0118817 A1    May 24, 2007

(51) Int. Cl.
*G06F 3/048* (2006.01)

(52) U.S. Cl. ............... 715/810; 715/764; 715/769; 715/783; 715/811; 715/825; 715/838

(58) Field of Classification Search ........... 715/769, 715/783, 810, 811, 838, 764, 825
See application file for complete search history.

(56) References Cited

U.S. PATENT DOCUMENTS

| | | | |
|---|---|---|---|
| 5,157,763 A | 10/1992 | Peters et al. | |
| 5,276,795 A | 1/1994 | Hoeber et al. | |
| 5,404,442 A * | 4/1995 | Foster et al. | 715/769 |
| 5,414,806 A * | 5/1995 | Richards | 715/810 |
| 5,559,942 A | 9/1996 | Gough et al. | |
| 5,579,466 A | 11/1996 | Habib et al. | |
| 5,664,128 A * | 9/1997 | Bauer | 715/708 |
| 5,715,413 A * | 2/1998 | Ishai et al. | 715/825 |
| 5,764,873 A * | 6/1998 | Magid et al. | 715/769 |
| 5,828,376 A | 10/1998 | Solimene et al. | |
| 5,835,091 A | 11/1998 | Bailey et al. | |
| 5,913,063 A * | 6/1999 | McGurrin et al. | 717/109 |
| 6,177,935 B1 * | 1/2001 | Munn | 715/769 |
| 6,232,972 B1 * | 5/2001 | Arcuri et al. | 715/815 |
| 6,366,294 B1 | 4/2002 | Cunningham et al. | |
| 6,426,761 B1 | 7/2002 | Kanevsky et al. | |
| 6,509,912 B1 * | 1/2003 | Moran et al. | 715/762 |
| 6,654,766 B1 | 11/2003 | Degenaro et al. | |
| 6,693,652 B1 * | 2/2004 | Barrus et al. | 715/838 |
| 6,795,096 B2 | 9/2004 | Meaden | |
| 6,877,138 B2 * | 4/2005 | Fitzpatrick et al. | 715/769 |
| 6,931,416 B2 * | 8/2005 | Kelley et al. | 707/102 |
| 6,961,907 B1 | 11/2005 | Bailey | |
| 7,171,621 B1 | 1/2007 | Johns et al. | |
| 7,188,319 B2 * | 3/2007 | Amadio et al. | 715/835 |
| 7,293,242 B2 | 11/2007 | Cossey et al. | |

(Continued)

*Primary Examiner*—Tadesse Hailu
*Assistant Examiner*—Nicholas S Ulrich
(74) *Attorney, Agent, or Firm*—Stetina Brunda Garred & Brucker

(57) ABSTRACT

There is provided a method for use with a software application. The method includes a step of generating a palette window having a drawing mode and a properties mode. The method includes a step of generating on the palette window in the drawing mode a first thumbnail representative of a first data object having first attributes associated therewith. The first thumbnail is operative to initiate placement on a workspace window a second data object having second attributes derived from the first attributes. The method includes a step of generating on the palette window in the properties mode a first icon representative one of the first attributes. There is also provided a method for using such computer application.

34 Claims, 21 Drawing Sheets

U.S. PATENT DOCUMENTS

| | | | |
|---|---|---|---|
| 2003/0160824 A1* | 8/2003 | Szumla | 345/769 |
| 2004/0150671 A1 | 8/2004 | Kamiwada et al. | |
| 2005/0262107 A1* | 11/2005 | Bergstraesser et al. | 707/100 |
| 2006/0005163 A1* | 1/2006 | Huesken et al. | 717/107 |
| 2007/0101297 A1 | 5/2007 | Forstall et al. | |

* cited by examiner

METHOD OF TRACKING DUAL MODE DATA OBJECTS USING RELATED THUMBNAILS AND TOOL ICONS IN A PALETTE WINDOW

CROSS-REFERENCE TO RELATED APPLICATIONS

Not Applicable

STATEMENT RE: FEDERALLY SPONSORED RESEARCH/DEVELOPMENT

Not Applicable

BACKGROUND

1 Technical Field

The present invention relates to tracking of data objects, more particularly, to data objects having dual modes using related thumbnails and tool icons in a palette window.

2. Description of the Related Art

In the field of graphical computer applications, it is often desirable to reuse or repeat data in a variety of forms such as text, lines, geometric shapes, raster graphics, and so forth throughout documents. Additionally, it is recognized that such data may have a number of associated attributes that further define its appearance. It is also desirable to reuse such properties or settings. Information reuse was accomplished by practicing a number of now well known techniques to enable a user to replicate content or generate similar content having similar styles and tool settings.

One of the most familiar of such techniques is the "clipboard" function, which allows users to cut, copy, and paste selected data from one application to another or within the same application. This function is used extensively because it allows the user to avoid reentering data already present on the computer. Generally, all types of data, including text, graphics, equations, and tables can be transferred to and from the clipboard. This function is typically provided by the operating system, where applications written for the particular operating system "calls" the applicable programmed procedures relating to the clipboard functionality.

The clipboard function relies upon a reserved area of memory, which stores the copied data. The cut, copy, and paste commands may be invoked by the CTRL-X, CTRL-C, and CTRL-V keystroke sequences, respectively, which will be recognized by those familiar with the Windows operating system. Other well-known graphically oriented operating systems provide the same functionality often through similar keystroke sequences. Further, these functions may also be invoked from a drop-down menu. The cut command removes the selected data from the display into the clipboard memory. The copy command copies the selected data from the display into the clipboard memory. The paste command copies the contents of the clipboard memory to an indicated insertion point.

Prior to copying or cutting the data into the clipboard, the data must be selected. The user generally uses the keyboard or the mouse to select the desired data from a screen display. Then, the user invokes either the cut or copy command, and the selected data is transferred into the clipboard memory. As is well understood, data displayed on a computer display can be generally categorized into text data and graphics data. In order to select text data, the user positions an "I-beam" pointer at the beginning of the desired text by maneuvering the mouse, clicks and holds down a mouse button, drags the pointer to the end of the desired text, and releases the mouse button. To select text with the keyboard, the user positions the cursor at the beginning of the desired text, presses the shift key, and uses arrow keys to move to the end of the desired text. Text selected in either of the methods described typically appears on the screen display with a background color different from the background color of the non-selected areas of the text. In order to select graphics data in the form of objects, the user navigates a cursor to the graphic via the mouse, and clicks on the graphic. To select graphics data in the form of objects with the keyboard, the user positions a cursor onto the object using the arrow keys, tab key, or any other key not operative to input text. Selected graphics data usually appear with selection handles on corners or other boundaries of the graphic.

Early examples of clipboard functionality existed in word processing applications where textual data was selected, copied, and pasted according to the methods described above. Thus, repeat information need not be retyped, improving efficiency. However, according to early implementations of the clipboard functionality, only one selection of data could be copied to the clipboard memory. Therefore, multiple sections could not be copied and individually retrieved. Although methods such as those described in U.S. Pat. No. 6,961,907 to Bailey provided the ability to copy multiple segments into a single clipboard, those multiple sections could not be individually retrieved. In order to cure such deficiencies, application programs having a multiple position clipboard have been developed. The clipboard operates as a stack, where the most recent item was stored at the top of the stack. Users have the option of displaying the contents of the clipboard in a window, thus not being limited to pasting the last item stored in the clipboard. The user selects any of the items stored and the item was pasted in a desired location.

This concept was unsatisfactory, however, in that only the most recently used items were accessible, and that if multiple, duplicate items were copied, the duplicates remained in the clipboard. Additionally, alternately copying a same set of content also resulted in duplicates remaining in the clipboard. Another deficiency was that changes to the original content were not reflected in the clipboard since it was static. Moreover, the content stored in the clipboard could not be accessed across different user sessions since the clipboard contents were deleted once the application associated therewith was closed. Finally, it was still necessary for the user to initiate the process of selecting and copying the data through one or more of the methods described above.

Another well known technique for facilitating data reuse is saving the attributes of a tool, function, or content as a "default," enabling the user to create new content based on such saved attributes. As an example, typical word processor documents include editable settings such as font, color, border styles, and so forth. However, one deficiency with the use of such "default" attributes in the prior art is that there is only a single set of attributes for a particular tool, function, or content, and so forth. Accordingly, multiple variations of the same tool, function, or content are not readily accessible.

According to another well known technique for data reuse, custom tool palettes and tool presets may be utilized. With such a technique, graphical computer applications provide a number of tools such as pens, brushes, and airbrushes, as well as tools that facilitate the creation of geometric primitives such as lines, boxes, ellipses, and so forth. As is well understood, each of the tools is further defined by various attributes that further customize the appearance of content created with those tools. In such prior art techniques, a tool is selected from one of the tool palettes, the attributes for the tool are adjusted, and the tool is saved to a tool preset palette. The preset tool can then be utilized to generate content having the adjusted attributes. However, this technique also had a number of deficiencies, namely, that the user must predefine the tool before generating the content. Oftentimes it is desirable to generate content without first knowing which tool to use, and more particularly, without knowing the particular settings for the attributes associated with a given tool. With the aforementioned prior techniques, however, this was not possible.

Accordingly, there is a need in the art for an improved method for generating custom tools directly from produced content having a drawing mode and a properties mode.

BRIEF SUMMARY

There is provided a method for use with a software application. The method includes a step of generating a palette window having a drawing mode and a properties mode. The method includes a step of generating on the palette window in the drawing mode a first thumbnail representative of a first data object having first attributes associated therewith. The first thumbnail is operative to initiate placement on a workspace window a second data object having second attributes derived from the first attributes. The method includes a step of generating on the palette window in the properties mode a first icon representative one of the first attributes.

According to various embodiments, the first thumbnail may be a scaled graphical representation of the first data object. The first data object may represent text, a geometric primitive, or a raster image. The method may further include the step of generating other thumbnails on the palette window, where the palette window is in the drawing mode. The other thumbnails may be representative of preexisting data objects which may have preexisting data object attributes associated therewith. The method may also include the step of generating other icons on the palette window, where the palette window is in the properties mode. Further, the icons may be representative of the preexisting data object attributes associated with the preexisting data objects.

A given one of the first attributes may be a tool type attribute. Further, a given one of the preexisting data object attributes is a tool type attribute. According to such embodiment, the tool type attribute may define a type of tool used to create the associated data object. Additionally, the first icon may be representative of the first tool type attribute. Along these lines, the other icons may be representative of the preexisting data object tool type attributes.

The method may further include the step of grouping the first thumbnail and the other thumbnails according to the tool type attribute of respective ones of data objects in the drawing mode of the palette window. In further detail, the method may further include the step of grouping the first icon and the other icons on the palette window according to the tool type attribute of respective ones of data objects. The method may also include the step of storing in a palette memory the first data object and the preexisting data objects.

One of the first attributes may be a first history attribute, and one of the preexisting data object attributes is a preexisting data object history attribute. In one embodiment, the history attributes may be based upon a sequence of storing the associated data object in the palette memory in relation to the other data objects stored in the palette memory. In another embodiment, the history attributes may be based upon a number of times the associated data object was placed on the workspace window. Regardless of how the history attribute is determined, the method may further include the step of sorting the thumbnails according to the history attribute of the respective ones of the data objects. Additionally, the method may include the step of sorting the icons according to the history attribute of the respective ones of the plurality of data objects. The method may further include the step of storing in a palette memory the first data object and the preexisting data objects. Doing so will enable the data to be reused in subsequent user sessions. The method may include the step of generating a properties window in response to a selection of the icon. The properties window may have window elements operative to modify the first content property of the first data object. Furthermore, the first icon may be operative to initiate the placement on the workspace window a third data object. Upon placement on the workspace window, the third data object may have third attributes derived from the first attributes. The first icon may also be operative initiate the modification of preexisting attributes. The preexisting attributes may be associated with a preexisting data object on the workspace window.

According to another aspect of the present invention, there is provided a method for using a graphical computer application. The method includes the step of selecting a first thumbnail on a palette window in a drawing mode. The thumbnail is representative of a first data object having a plurality of first attributes. The selection is operative to initiate placement of a second data object on a workspace window. The second data object having second attributes derived from the first attributes. The method further includes a step of selecting a first icon on the palette window in a properties mode, the first icon being representative of at least one of the first attributes.

According to various embodiments, the selection of the thumbnail may result in a placement of the second data object in the workspace window. The second data object may be placed in a central region of the workspace window. The method may also include the step of selecting a placement location within the workspace window for a second data object. The placement location may be selected by positioning a cursor on the workspace window. The method may also include the step of modifying the second data object on the workspace window producing a modified second data object. Further, the method may include the step of selecting a thumbnail generated on the palette window in the drawing mode. The thumbnail may be generated in response to modifying the second data object on the workspace window. Moreover, the thumbnail is a scaled representation of the modified second graphical data object.

According to another embodiment, the method may further include the step of creating a third data object on the workspace window after selecting the icon on the palette window. The palette window is may be in the properties mode. The third data object may have attributes derived from the first data object attributes. The third data object may be created by positioning a cursor on the workspace window. The method may also include the step of selecting a preexisting data object having preexisting data object attributes. The data objects may be selected on the workspace window after selecting the icon on the palette window in the properties mode. The selection may be operative to initiate a modification to the preexisting data object attributes derived from the first data object attributes.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 21b illustrates a user creating a data object on the workspace window using the tool selected via an icon on the palette window as illustrated in FIG. 21a;

DETAILED DESCRIPTION

The detailed description set forth below in connection with the appended drawings is intended as a description of the presently preferred embodiment of the invention, and is not intended to represent the only form in which the present invention may be constructed or utilized. The description sets forth the functions and the sequence of steps for developing and operating the invention in connection with the illustrated embodiment. It is to be understood, however, that the same or equivalent functions and sequences may be accomplished by different embodiments that are also intended to be encompassed within the spirit and scope of the invention. It is further understood that the use of relational terms such as first and second, and the like are used solely to distinguish one from another entity without necessarily requiring or implying any actual such relationship or order between such entities.

Figure 1:
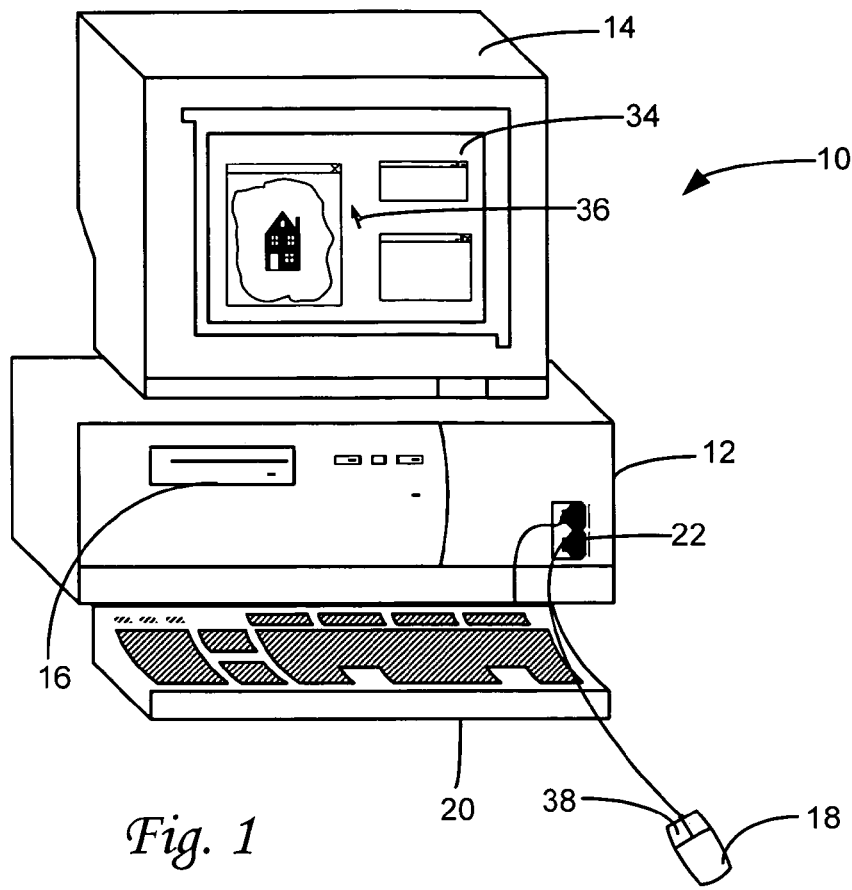
FIG. 1 is a perspective view of an exemplary computer system that may be capable to perform functions for use with aspects of the present invention.

With reference now to FIG. 1, an exemplary hardware environment capable for use with the present invention is shown as an exemplary computer system 10. As shown in FIG. 1, provided is a personal computer 12 with an attached monitor 14 for graphically displaying output from the personal computer 12. The personal computer 12 may also include an optical drive 16, and any number of input devices such as a mouse 18 and a keyboard 20. Further, additional input devices such as a graphical tablet (not shown) may also be attached to the personal computer 12. Typically, such input devices are connected to the personal computer 12 through a USB port 22, however, alternative interconnects such as a PS/2 port or a RS-232 serial port is also contemplated.

Figure 2:
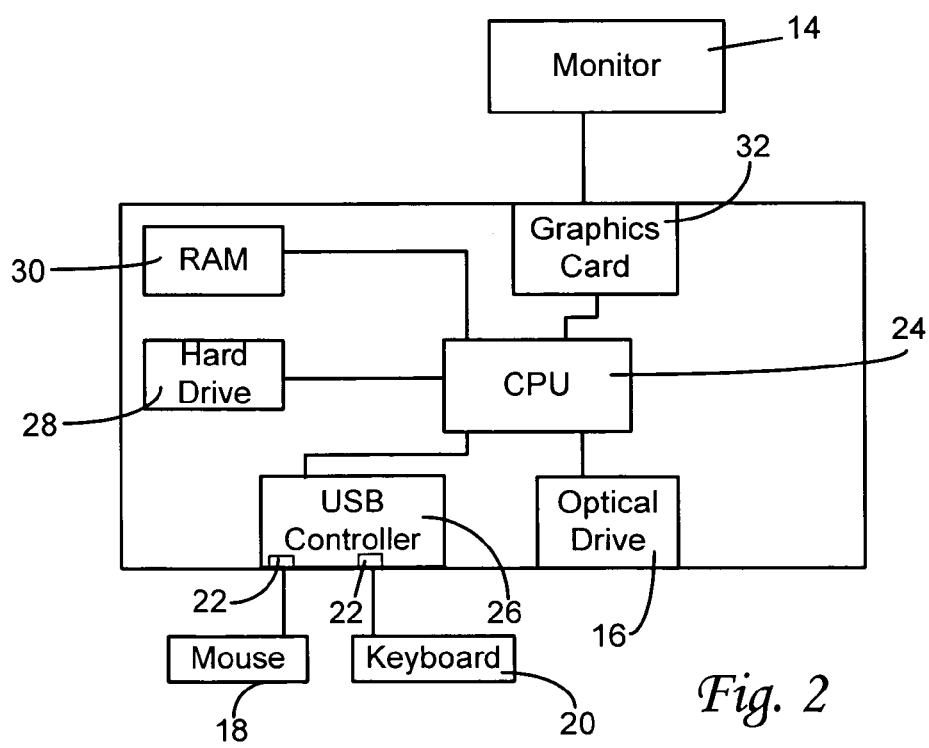
FIG. 2 is a block diagram of system components of the exemplary computer system of FIG. 1.

Further details of the exemplary computer system 10 are shown in FIG. 2 as a block diagram, with the personal computer 12 including a central processing unit (CPU) 24 receiving input from the mouse 18 and the keyboard 20 through the USB port 22. The USB port 22 is connected to a USB controller 26, which processes the signals from the mouse 18 and the keyboard 20 and forms packets of data to be transmitted to the CPU 24. Furthermore, the personal computer 10 includes a hard drive 28 for long term storage of data, a random access memory (RAM) 30 for short term storage of data, and the optical drive 16 for permanent storage or input of data. It will be readily appreciated that the optical drive 16 may be a CD-ROM drive, CD-R drive, CD-RW drive, DVD-ROM drive, and so forth. Output from the CPU 24 is further processed by a graphics card 32, which transmits signals to the monitor 14. The results of the data processing operation as carried out by the CPU 24 are displayed as graphics on the monitor 14. It will be understood that any type of monitor 14, such as a Cathode Ray Tube (CRT), Liquid Crystal Display (LCD) or any other suitable display means may be substituted.

As will be readily appreciated, the computer system 10 may utilize any operating system having a graphical user interface (GUI), such as Microsoft Windows®, Apple MacOS®, UNIX operating systems utilizing X Windows, and so forth. The personal computer 12 executes one or more computer applications 34, which are represented in FIG. 1 by the "windows" displayed on the monitor 14.

Generally, the operating system and the computer application 34 are tangibly embodied in a computer-readable medium, e.g. one or more of the fixed and or removable data storage devices including the hard drive 28 or optical media read by the optical drive 16. Both the operating system and the computer application 34 may be loaded from the aforementioned data storage devices into the RAM 30 for execution by the CPU 24, and comprise instructions which, when read and executed by the CPU 24, causes the personal computer 12 to perform the steps necessary to execute the steps or features of the present invention.

With regard to the specific interaction between a user and the computer system 10, with additional reference to FIG. 3a and 3b, a cursor 36 is directed via the mouse 18 to locations within the monitor 14 having a number interactive elements, the details of which will be described more fully below. The mouse 36 may include one or more mouse buttons 38. A data processing procedure may be initiated by the user activating such interactive elements through clicking the mouse buttons 38 while cursor 36 is positioned on or near the interactive element. Additionally, a key 40 on the keyboard 20 may be pressed to initiate a data processing procedure.

It will also be understood by a person having ordinary skill in the art that while the following description of the invention refers to steps carried out in an exemplary computer system 10, any other data processing device having similar functionality may be used without departing from the scope of the invention. Moreover, while the following description of the invention refers to "clicking" a mouse button 38, "positioning" a cursor 36 within the monitor 14 and so forth, a person having ordinary skill in the art will recognize these terms to refer to any similar user interaction with the computer system 10 through a graphical user interface.

Figure 3A:
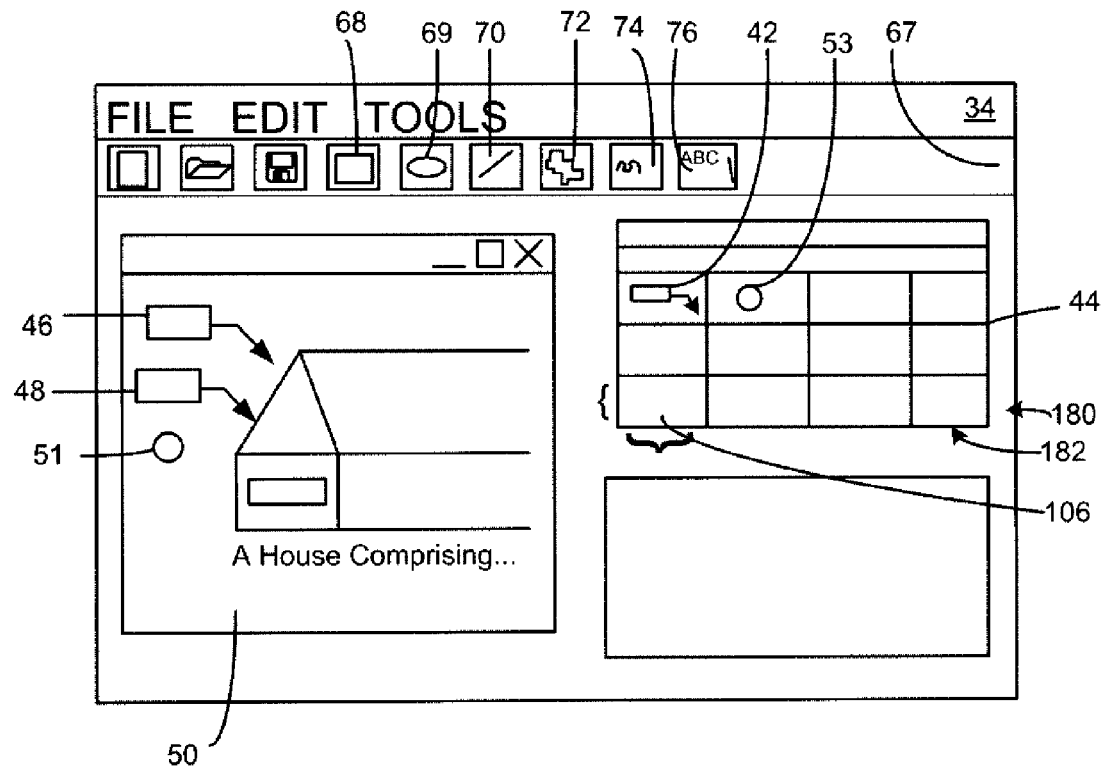
FIG. 3a illustrates a window having a tool bar, a workspace window and a palette window operable on the computer system of FIGS. 1 and 2 in accordance with an aspect of the present invention.
Figure 3B:
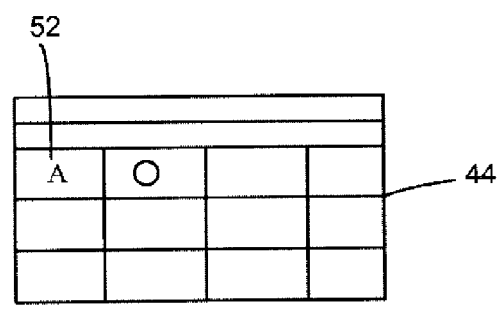
FIG. 3b illustrates a palette window displaying an icon.
Figure 4:
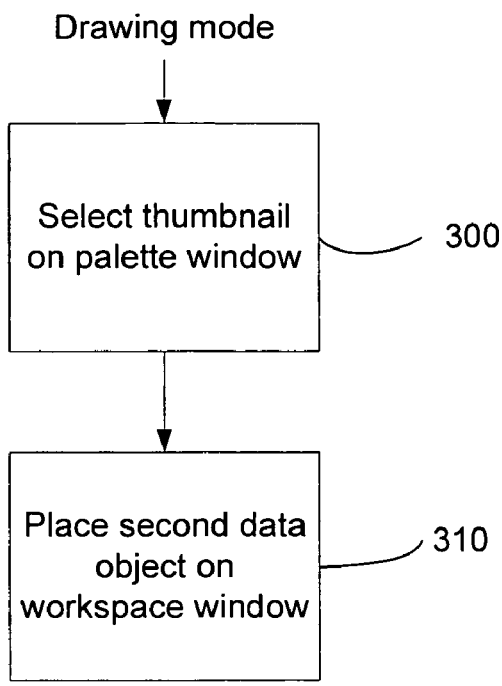
FIG. 4 is a flowchart illustrating the steps taken to place in a drawing mode a data object on the workspace window by selecting a thumbnail.
Figure 5:
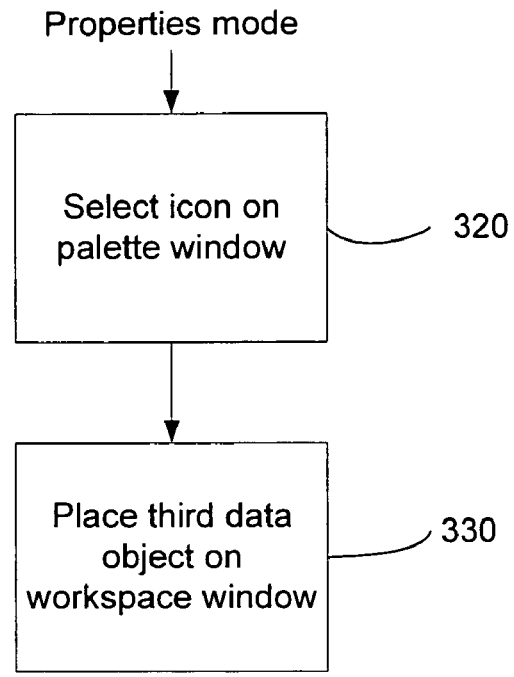
FIG. 5 is a flowchart illustrating the steps taken to place in a properties mode a data object on the workspace window by selecting an icon.
Figure 7:
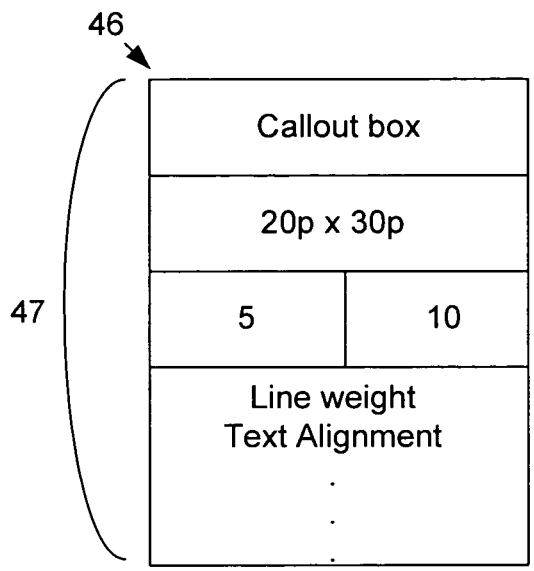
FIG. 7 is a block diagram illustrating a first exemplary data stored in the attributes associated with a data object.
Figure 8:
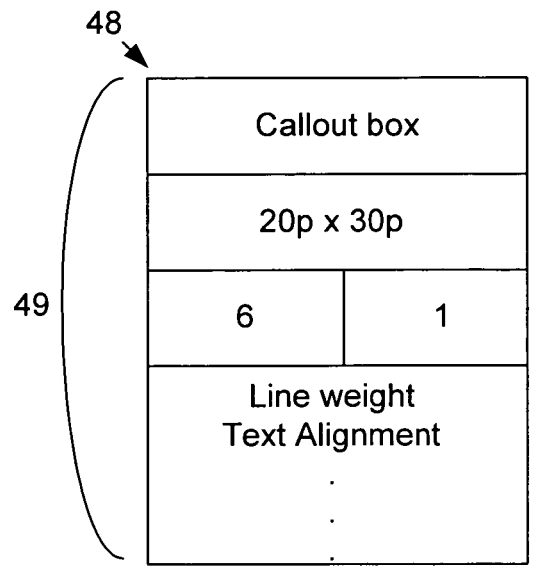
FIG. 8 is a block diagram illustrating a second exemplary data stored in the attributes associated with a data object.

Referring now to FIG. 3a and FIG. 3b, there is depicted the graphical computer application 34. FIG. 4 and FIG. 5 depict flowcharts in accordance with steps of a method according to an aspect of the present invention. There is provided a method for using the graphical computer application 34. The method includes a step 300 of selecting a first thumbnail 42 on a palette window 44 in a drawing mode as shown in FIG. 3a. The first thumbnail 42 is representative of a first data object 46 having a plurality of first attributes 47 as illustrated in FIG. 7. Next, the method includes step 310 of initiating the placement of a second data object 48 on a workspace window 50. According to an aspect of the invention, the second data object 48 has second attributes 49 as illustrated in FIG. 8 which are derived from the first attributes 47 illustrated in FIG. 7. The method continues with a step 320 of selecting a first icon 52 on the palette window 44 in a properties mode as shown in FIG. 3b. The first icon 52 is representative of at least one of a first attributes 47 shown in FIG. 7. Upon selecting the first icon 52, a third data object 54 is placed on the workspace window 50 according to step 330.

Figure 9:
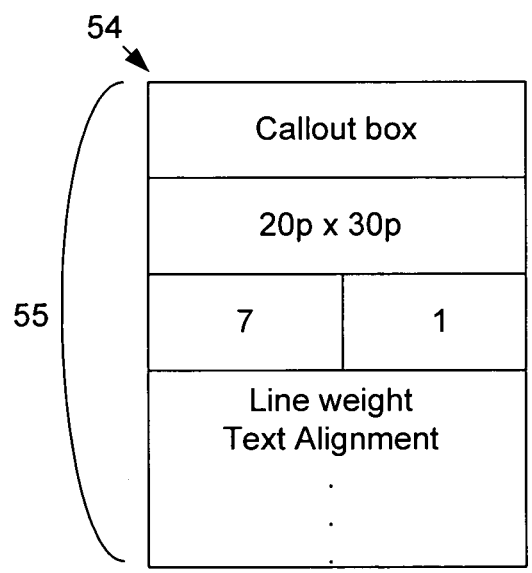
FIG. 9 is a block diagram illustrating a third exemplary data stored in the attributes associated with a data object.

With regard to the term "data object" as used herein, the term refers to a conceptual entity generally corresponding to a contiguous block of a specific size at a specific location in memory having one or more attributes that define the entity. However, specific instances embodied in the visualizations of the same as in the first data object 46, the second data object 48, and the third data object 54 are also understood to be encompassed by the term "data object." Referring to FIG. 5, a block diagram of an exemplary data object structure 56 is shown, where an instance 58 of the data object structure 56 includes a plurality of attributes, namely, a tool type attribute 60, a parameters attribute 62, a history attribute 64, and a properties attribute 58. It will also be understood that instances of the data object structure 56 also include the first data object 46 as illustrated in FIG. 7, the second data object 48 as illustrated in FIG. 8, and a third data object 54 as illustrated in FIG. 9. The respective data objects are thus defined by the first attributes 47, the second attributes 49, and a third attributes 55. The specific uses of each of the plurality of attributes will be discussed in further detail hereunder.

Before embarking on a detailed discussion on the use and generation of the first thumbnail 42, first icon 52, and other such entities, the generation and modification of data objects on the workspace window 50 according to an aspect of the present invention will be discussed. In the following examples, specific data object types will be referenced, however, it is understood than any data object capable of being displayed on the workspace window 50 is deemed to be encompassed within the scope of the present invention, such as brush strokes, text blocks, and so forth. Additionally, data objects may also include graphics copied from existing sources, such as digital pictures and other raster images which are defined in terms of pixel value instead of in terms of geometric primitives.

Figure 10A:
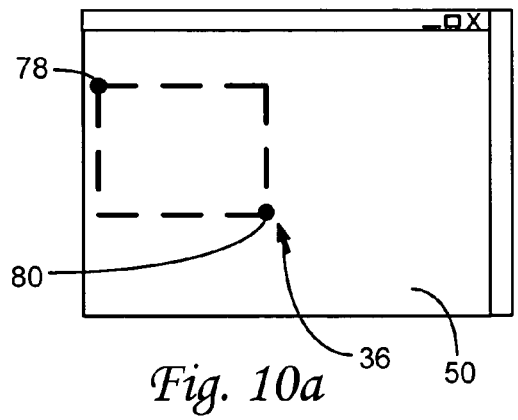
FIG. 10a illustrates an object being created on the workspace window.
Figure 10B:
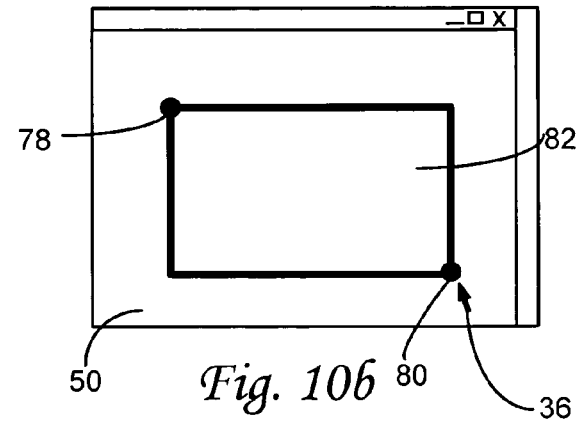
FIG. 10b illustrates a box after being created on the workspace window.
Figure 10C:
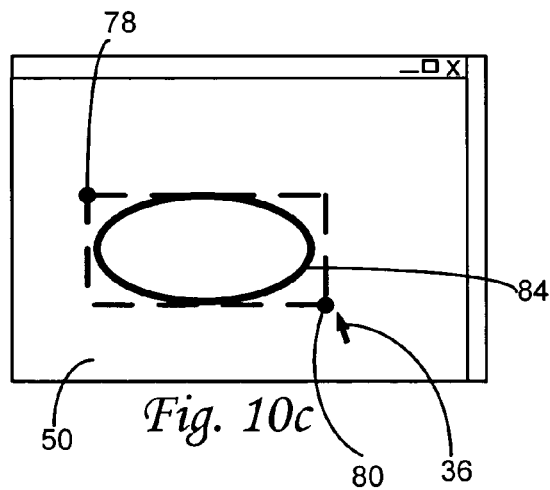
FIG. 10c illustrates an ellipse after being created on the workspace window.
Figure 10D:
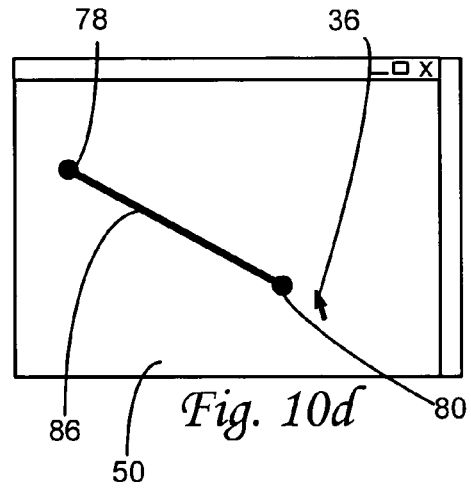
FIG. 10d illustrates a line after being created on the workspace window.

Referring to FIGS. 10a and 10b, there is depicted the workspace window 50 and a sequence of views depicting the generation of a data object defined as a box 82. The process begins with selecting a box icon 68 from a tool bar 67 as shown in FIGS. 3a and 3b. In workspace window 50 the method includes clicking the mouse button 38 at a first location 78 within the workspace window 50, dragging the cursor 36 to a second location 80 and releasing the mouse button 38 to generate a data object defined as the box 82. The box 82 has opposed corners of the first location 78 and the second location 80. In another example, the method may include first selecting an ellipse icon 69 from the toolbar 67 as shown in FIGS. 3a and 3b and performing similar operations as above to generate a data object defined as an ellipse 84 as shown in FIG. 10c. The ellipse 84 is defined by opposed corners of the first location 78 and the second location 80. As per another example, the method includes first selecting a line icon 70 from the toolbar 67 as shown in FIGS. 3a and 3b. As depicted in FIG. 10d, performing similar operations as above to generate a data object defined as a line 86 having endpoints at the first location 78 and the second location 80.

Figure 10E:
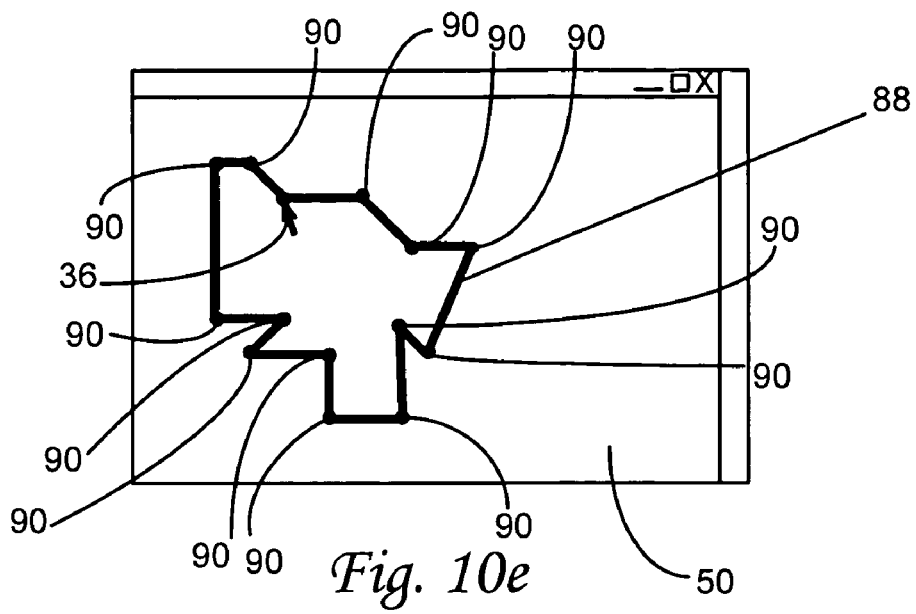
FIG. 10e illustrates a polygon after being created on the workspace window.

The data objects capable of being created on the workspace window 50 are not limited to primitive geometric shapes created by defining opposed endpoints in the manner previously described. The data objects can also include complex shapes such as a polygon 88 having multiple endpoints 90 with segments interconnecting the same as shown in FIG. 10e. In generating the polygon 88, a polygon icon 72 is selected, and then the cursor 36 is navigated to each of the endpoints 90, mouse button 38 is clicked at each endpoint and a line segment is then generated between the previous endpoint and the recently selected endpoint. It is contemplated that lining effects may be imposed upon the polygon 88 so as to modify the lining from the solid lining as shown to dashed, paintbrush, cloud effect, etc. As will be readily appreciated by one of ordinary skill in the art, "clicking" the mouse button 38 is a rapid depression and release of the same.

Figure 10F:
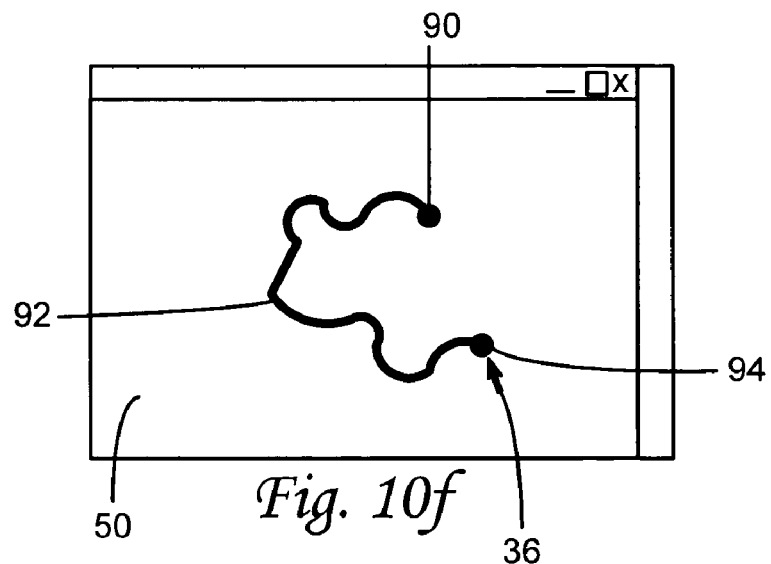
FIG. 10f illustrates a freeform graphic after being created on the workspace window.

A freeform object 92 may also be generated on the workspace window 50 by first selecting the pen icon 74 of FIG. 3. As shown in FIG. 10f, the method for generating another data object may include selecting an endpoint 90, pressing the mouse button 38, and dragging the cursor 36 in the desired outline 94. Used in this context, one of ordinary skill in the art will recognize that "pressing" the mouse button 38 refers to holding down the mouse button 38 indefinitely. The mouse button 38 is released once the cursor 36 is positioned at an ending endpoint 90.

Figure 10G:
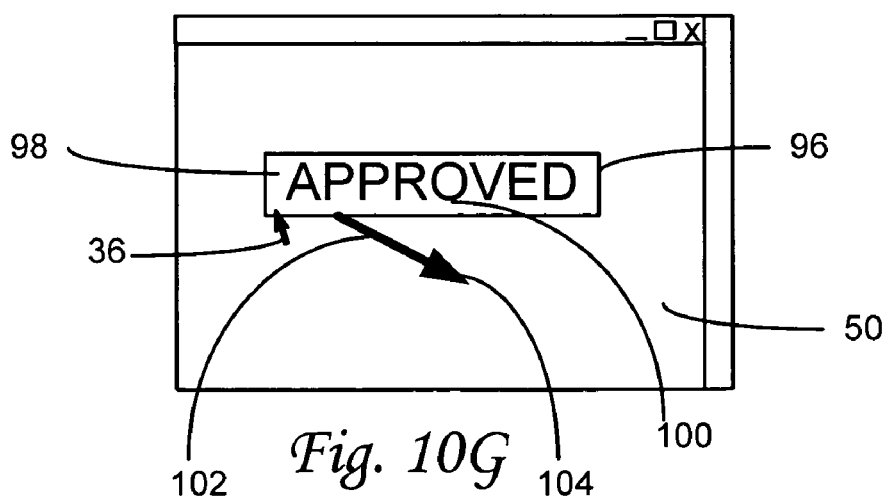
FIG. 10g illustrates a callout box after being created on the workspace window.

Another data object that can be generated on the workspace window 50 is a callout box 96 as shown in FIG. 10g. The callout box 96 may typically include a box-shaped container 98, a callout text 100, and a callout line 102 with an arrow 104. The callout box 96 may be generated in steps similar to that of generating the box 82 of FIG. 10b, but because the callout box 96 typically requires little dimensional adjustment upon placement for consistency across multiple instances, an alternative method may include selecting the callout box icon 76 and clicking a placement location within the workspace window 50. Thereafter, the callout box 96 is placed on the workspace window 50, and the callout text 100 may be added via keyboard input.

It is understood that the above described selection of a tool icon and the generation of a corresponding data object on the workspace window 50 as set forth in the examples above may be understood to mean "using" that particular tool to "create" such corresponding data object.

Figure 11A:
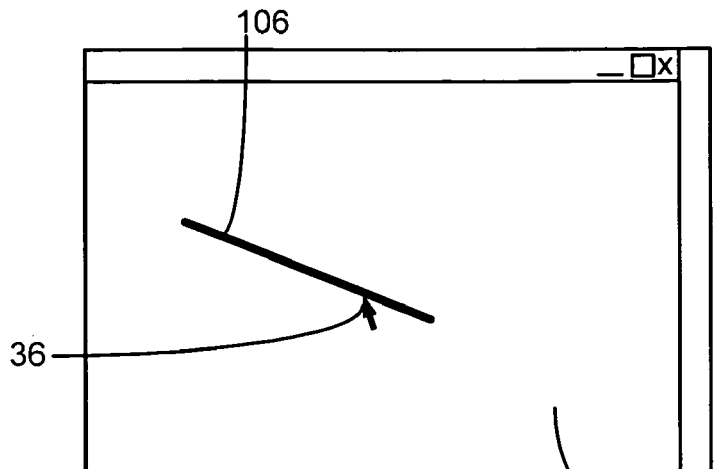
FIG. 11a illustrates a line being selected by the user.
Figure 11B:
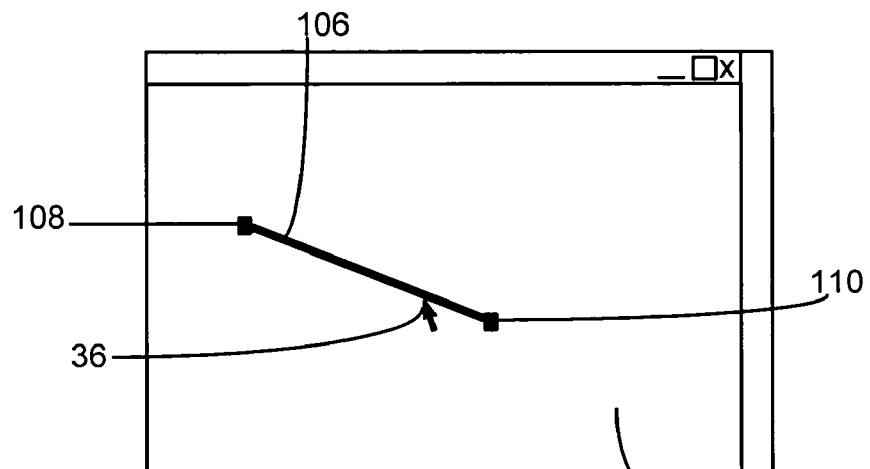
FIG. 11b illustrates a control point of the line being selected by the user.
Figure 11C:
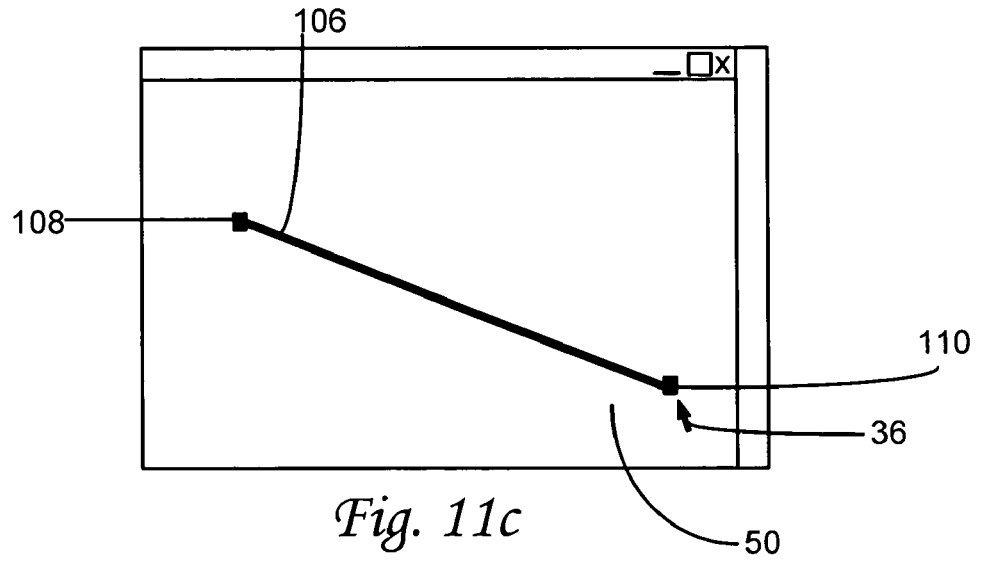
FIG. 11c illustrates the line being modified by the user.

Modifications may also be made to the data objects already placed on the workspace window 50. For the purpose of simplification, and with reference to FIGS. 11a-11c, the line 106 is shown on the workspace window 50. Upon selecting the line 106 by navigating the cursor 36 to overlap the same, the mouse button 38 is clicked, producing a first handle 108 and a second handle 110. The cursor 36 is then navigated to the second handle 110, and as illustrated, the cursor 36 overlaps the second handle 110. The mouse button 38 is pressed, and while remaining pressed down, the cursor 36 and the second handle 110 are dragged to the desired location, thus modifying the location of the second handle 110, resulting in a line 106' with an second handle 110' In essentially the same manner, other data objects can be modified. In this regard, the term "modify" as used herein may refer to the steps taken to change the appearance or contents of data objects as described.

Figure 6:
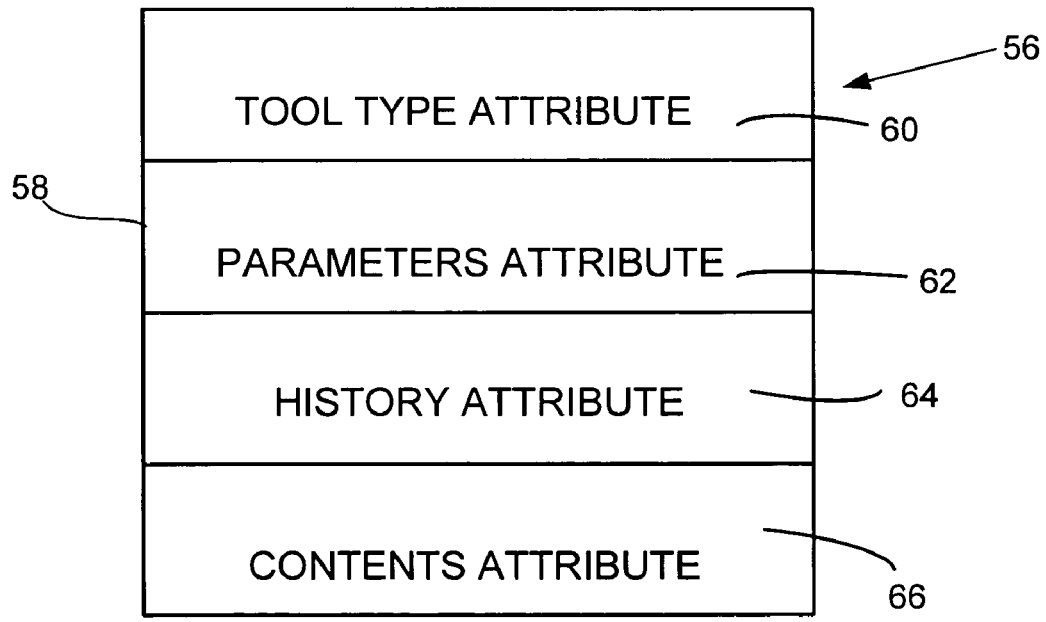
FIG. 6 is a block diagram illustrating exemplary attributes associated with a data object.

With reference to FIG. 6, the aforementioned data objects are each structured according to data object structure 56. Each data object so mentioned includes the tool type attribute 60, which defines the type of tool used to create the data object, such as the box tool, the ellipse tool, the line tool, the polygon tool, the pen tool, the callout box tool, and so forth. It essentially defines the type of the data object. Additionally, each data object so mentioned includes a parameters attribute 62, which defines the dimensions and the appearance of the data object. An example of such a definition includes coordinates of the relevant endpoints defining the data object as it appears on the workspace window 50.

While the steps and the user inputs necessary to generate and modify the data objects as shown above have been detailed with reference to mouse inputs in specific sequences, alternative sequences may also be utilized. A person having ordinary skill in the art will recognize the above described sequences are the most commonly utilized in graphical computer applications capable of graphically modifying and arranging data objects, but there are other existing sequences that may be substituted without departing from the scope of the present invention.

Figure 12:
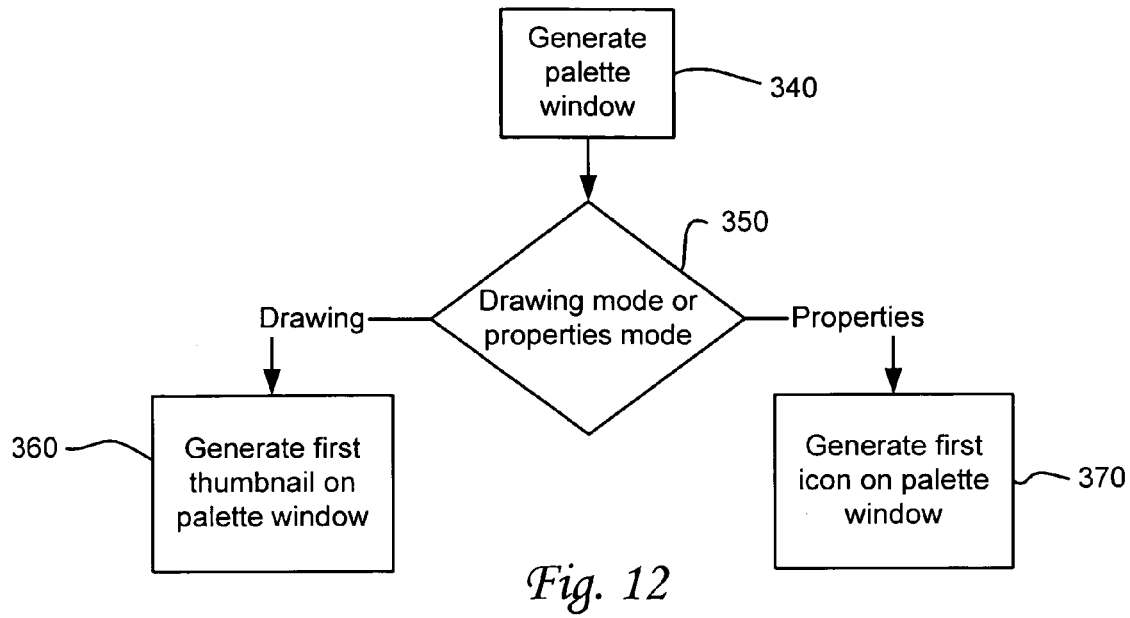
FIG. 12 is a flowchart illustrating the steps taken to generate a palette window in accordance with an aspect of the present invention.

According to another aspect of the present invention as illustrated in the flowchart of FIG. 12, provided is a method for use with a graphical computer software application. With reference additionally to FIG. 3a, the method includes a step 340 of generating a palette window 44 having a drawing mode and a properties mode. Next, in step 350 it is determined whether the palette window 44 or portions thereof are in a drawing mode or a properties mode. In the drawing mode, according to step 360, the method includes generating on the palette window 44 the first thumbnail 42 representative of the first data object 48. As illustrated in FIG. 7, the first data object 48 has the first attributes 47 associated therewith. The first thumbnail is operative to initiate placement on the workspace window 50 the second data object 48 having the second attributes 49 illustrated in FIG. 8 derived from the first attributes 47. The method continues with a step 370 in generating on the palette window 44 in the properties mode the first icon 52 representative of one of the first attributes 47.

Further details of the generation of thumbnails and icons in the palette window 44 in accordance with an aspect of the present invention will be best understood with reference to multiple data objects. As in FIG. 13, multiple data objects are stored in a palette memory 112. Palette memory 112 is illustrated in table form with individual cells organized according to columns and rows. As discussed above, a data object is an entity generally corresponding to a contiguous block of memory having attributes defining the entity. Each column of the palette memory 112 is understood to refer to a data object, with the leftmost column representative of a first data object 114. The column immediately to the right of the first data object 114 is representative of a second data object 116, and the column immediately to the right of that is representative of a third data object 118. The column immediately to the right of the third data object 118 is a fourth data object 120, and the column immediately to the right of that is representative of fifth data object 122. Each of the data objects have corresponding attributes associated therewith in accordance with the description set forth for data object structure 56 of FIG. 6, the detailed use of which will be discussed in further detail below. It will be recognized by a person having ordinary skill in the art that palette memory 112 is a reserved area of RAM 30 as shown in FIG. 2. Although the use of the RAM 30 is preferred because of its relatively fast access speeds, alternative storage mediums such as the hard drive 28 may also be utilized.

Figure 14:
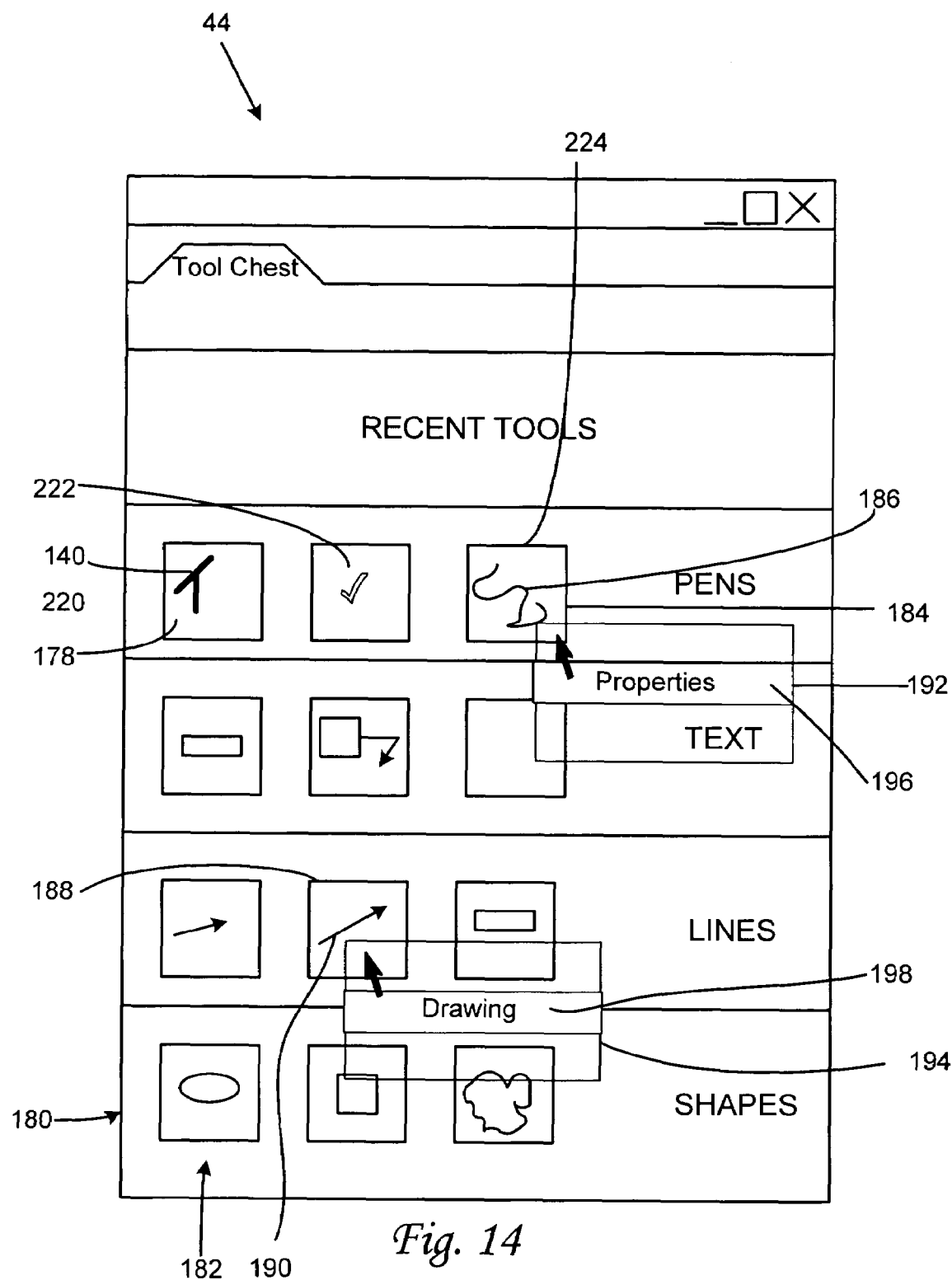
FIG. 14 is a detailed view of a palette window.

With reference to FIG. 14, the palette window 44 having a drawing mode and a properties mode is shown. The palette window 44 has individual cells 178 which are organized into rows 180 and columns 182. In a preferred embodiment, each of the individual cells 178 is capable of existing in the drawing mode or the properties mode independently of another. In another embodiment, it will be understood that the individual rows 180 or the individual columns 182 may in its entirety exist in the drawing mode or the properties mode. Additionally, according to yet another embodiment, it may be possible for all of the cells 178 on the palette window 44 in its entirety exist in the drawing mode or the properties mode. As used herein, a palette window having a drawing mode or a properties mode is understood to mean any of the foregoing embodiments.

As an illustrative example of the palette window 44 existing in the two modes, while in the drawing mode, a first exemplary cell 184 displays a first exemplary thumbnail 186. With additional reference now to FIG. 13, suppose the first data object 114 has the tool type attribute 164 equaling the pen. Further suppose that the first exemplary thumbnail 186 represents the first data object 114, meaning that the first parameters 154 contain values which, when rendered, substantially duplicate first exemplary thumbnail 186. In this situation, when first exemplary cell 184 is in the drawing mode, the first data object 114 is scaled and rendered according to the methods set forth hereunder, and displayed as an exemplary thumbnail 184. Continuing with this exemplary data, if, on the other hand, the first exemplary cell 184 is in the properties mode, the first exemplary cell 184 displays an icon representative of the tool found in the first tool type attribute and is displayed in the first exemplary cell 184. In this manner, the data contained in the first data object may be differentiated and individually selected between the various attributes therein depending on the mode selected.

In order to switch from the drawing mode to the properties mode, the cursor 36 is navigated to first exemplary cell 184, which is in the drawing mode, and mouse button 38 is pressed for a set period of time. Thereafter, a first context menu 192 is displayed with a first menu item 196 shown as "properties". Releasing the mouse button 38 with the cursor 36 hovering over the first menu item 196 will select the same, and switch first exemplary cell 184 to the properties mode. In likewise fashion, in order to switch from properties mode to the drawing mode, the cursor 36 is navigated to a second exemplary cell 188, which is in the properties mode, and mouse button 38 is pressed for a set period of time. Thereafter, a second context menu 194 is displayed with a second menu item 198 shown as "drawing". Releasing the mouse button 38 with the cursor 36 hovering over the second menu item 198 will select the same, and switch second exemplary cell 188 to the drawing mode. Accordingly, second icon 190 is no longer displayed, and is replaced by a thumbnail representative of a data object associated with the second icon 190. While specific mention has been made to pressing the mouse button 38 for a set period of time in order to activate the context menus 192 and 194, any method alternative to pressing down the mouse button 38 is deemed to be within the scope of the invention, such as clicking the mouse button 38 in conjunction with a particular key on keyboard 20. Additionally, an alternative mouse having a left and a right button may be utilized, in which clicking the right button is operative to activate the context menus. In such alternative configurations, as is well known in the art, clicking the left button is equivalent to the default "clicking" of mouse button 38 in activating thumbnails, icons, and so forth.

With regard to the following, whenever reference has been made to a thumbnail, it will be understood that the palette window 44 is in the drawing mode. It will also be understood that where an icon has been referenced, the palette window 44 is in the properties mode.

Figure 15A:
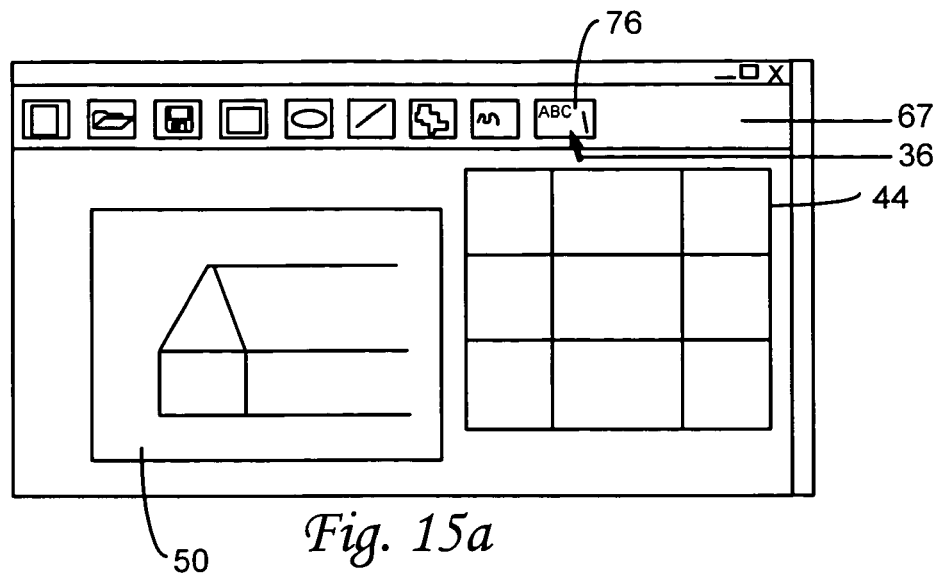
FIG. 15a illustrates an icon on the toolbar being selected by a user.
Figure 15B:
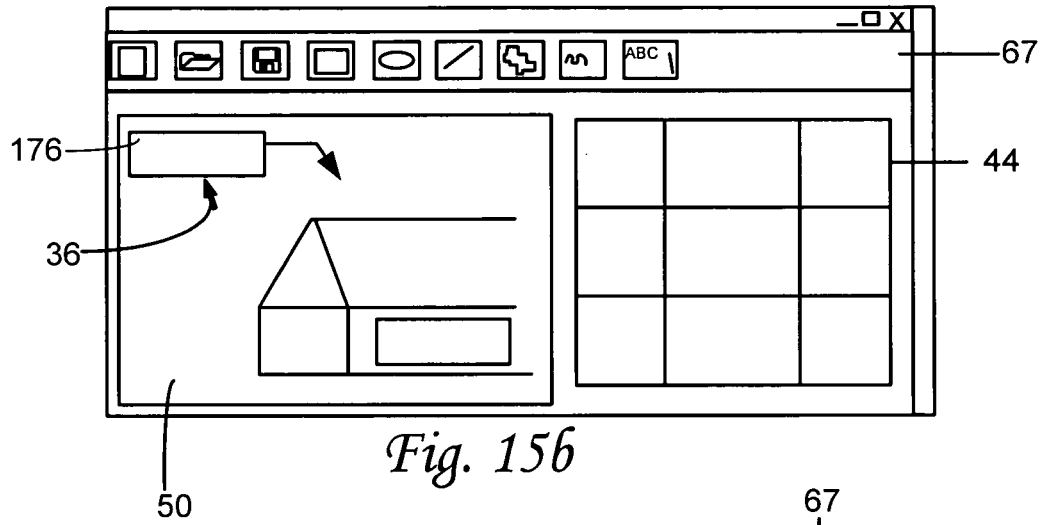
FIG. 15b illustrates a data object being placed in the workspace window.
Figure 15C:
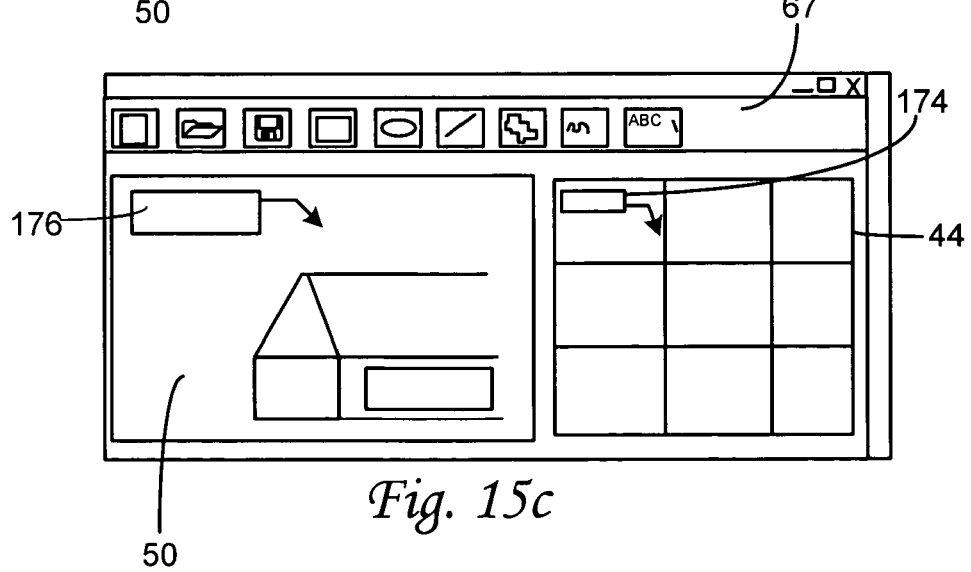
FIG. 15c illustrates a thumbnail being generated in response to the data object being placed in the workspace window.
Figure 16:
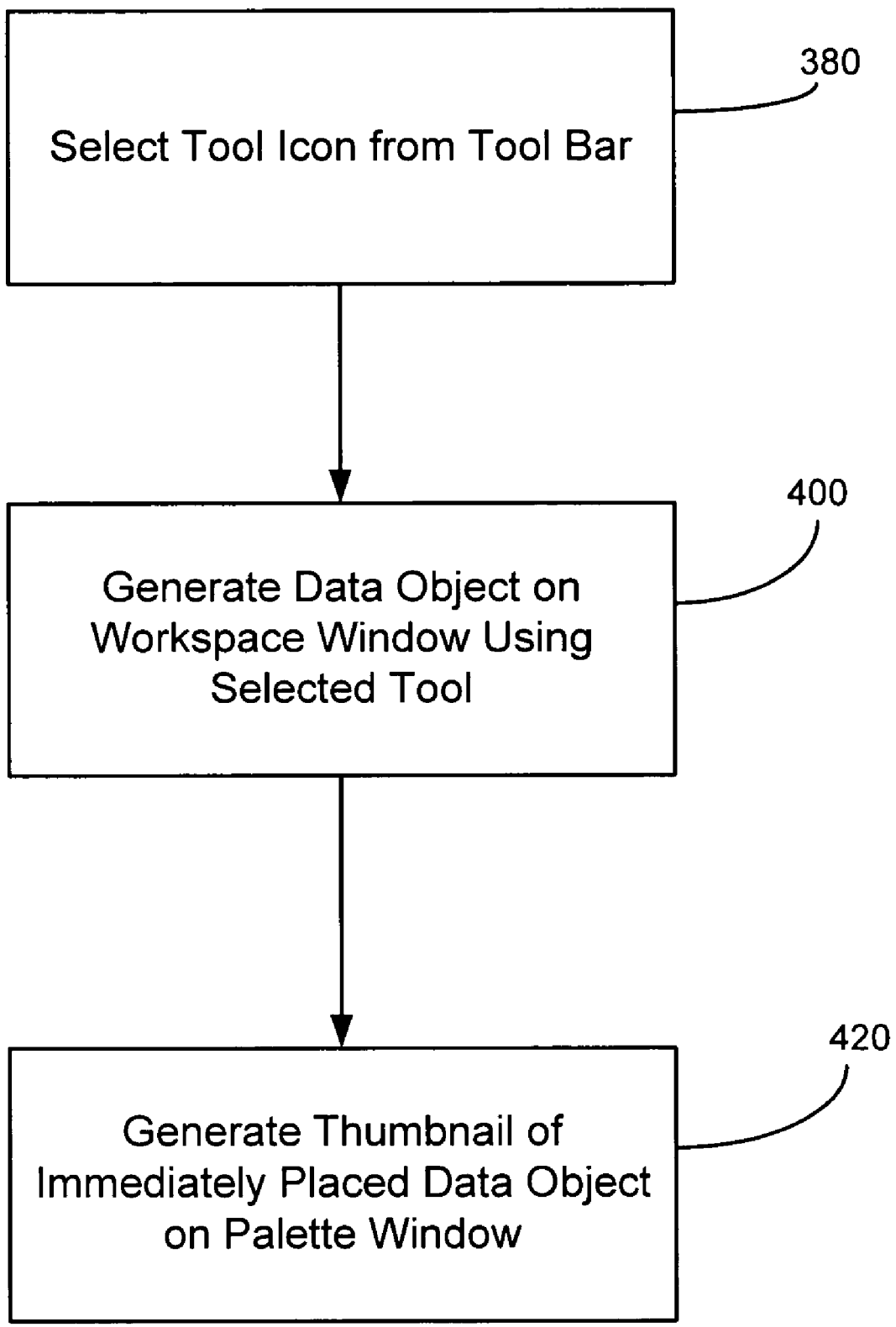
FIG. 16 is a flowchart illustrating the steps taken to generate a thumbnail of a data object created on the workspace window.

The various user interactions with respect to the palette window 44 in the drawing mode will now be considered. Referring now to FIGS. 15a-15c, there is depicted a sequence of views of the workspace window 50. FIG. 16 depicts a flowchart illustrating a method for generating a first thumbnail 174 in a palette window 44 in a drawing mode in relation to the user's perspective. For the purpose of example only and not of limitation, the method includes a step 380 of selecting a tool icon (such as any of the icons 68, 69, 70, 72, 74 or 76 from the toolbar 67 for example). Next, the method includes step 400 of generating a data object on the workspace window 50 using the selected tool associated with such tool icon. Finally, the method includes the step 420 of generating a thumbnail of the immediately placed data object on the palette window 44.

In further detail as discussed with reference to FIGS. 15a-15c, there is depicted a sequence of views of the workspace window 50 and the palette window 44. This example illustrates generation of a data object in the form of a callout box 176. The callout box icon 76 is clicked after navigating cursor 36 to the same as in the step 380 and as further illustrated in FIG. 15a. At this point, the palette window 44 is blank as shown. Thereafter, the callout box 176 is placed within the workspace window 50 according to the step 400 and as shown in FIG. 15b. The desired placement location is selected by navigating the cursor 36 to such location and clicking the mouse button 38. Prior to releasing the mouse button 38, the palette window 102 is also blank. Upon releasing the mouse button 38, the callout box 176 is placed on the workspace window 50, and the first thumbnail 174 is generated in the palette window 50 according to the step 420.

The generation of the thumbnail 174 in the palette window 44 presupposes that there is no duplicate data object already displayed as a thumbnail in the palette window 44. If such duplicate thumbnail already exists in the palette window 44, a new thumbnail representative of the immediately placed callout box 176 is not generated in the palette window 44. This is because there would be no need to provide the user with the availability of the thumbnail as a readily accessible "tool" or "shortcut" for his/her usage as such a tool would already be available. In this regard, duplicate data objects placed on the workspace window 50 are not duplicated in the palette window 44. The decision making procedures related to this functionality will be discussed in further detail hereunder.

Referring back to FIG. 3, the palette window 44 is divided into individual cells 178 and organized in rows 180 and columns 182. Each individual cell 178 is defined by a cell height 200 and a cell width 202. According to one embodiment, the cell height 200 and the cell width 202 may be adjusted by the user individually. According to another embodiment, the cell height 200 and the cell width 202 adjust in size as the overall size of the palette window 44 is adjusted. According to still another embodiment, the cell height 200 and the cell width 202 are predetermined, that is, not adjustable, where only the number of cells 178 displayed in the palette window 44 per row 180 or per column 182 are adjusted as the size of the palette window 102 is adjusted.

Regardless of variety in the sizing adjustments capable of being made according to the various embodiments, exemplary first and second thumbnails 42 and 51 are scaled to fit the constraints of the cell height 200 and the cell width 202. Thus, if the size of the data object is larger than the screen area defined by the cell height 200 and the cell width 202 as in first data object 46, then the corresponding first thumbnail 42 is scaled down to appear smaller than that of the data object. Along these lines, if the size of the data object is smaller than the screen area defined by the cell height 200 and the cell width 202 as in a fourth data object 51, then a corresponding fourth thumbnail 53 is scaled up to appear larger than that of the data object. Moreover, if the size of the data object is the same as the screen area defined by the cell height 200 and the cell width 202, then there is no scaling necessary to produce a thumbnail. As will be readily understood, the aforementioned scaling operation may be performed according to any well known technique in the art. It is understood that in the course of such scaling operation, the generated thumbnails need not be an exact representation having all of the details contained in the respective data objects.

Figure 17A:
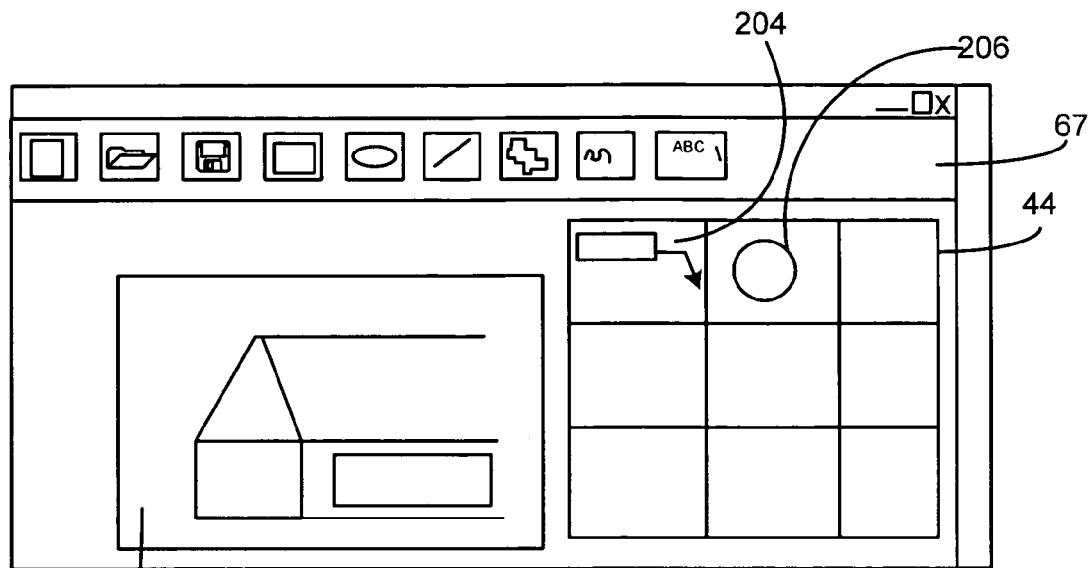
FIG. 17a illustrates a workspace window having no data objects placed thereon with a palette window containing thumbnails.
Figure 17B:
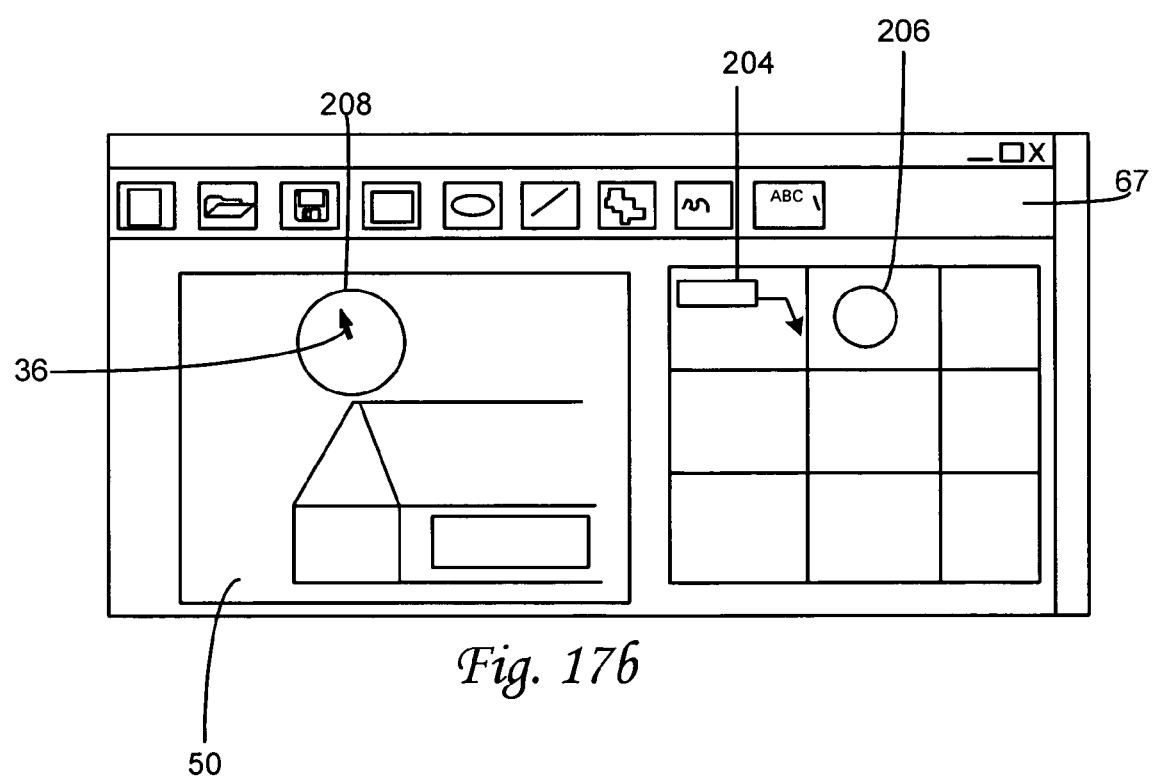
FIG. 17b illustrates the workspace window having a data object placed thereon and being moved after a selection of a thumbnail on the palette window.

Now referring to FIGS. 17*a*-*d* there is depicted a sequence of views of the workspace window 50. FIG. 18 depicts a flowchart illustrating a sequence of using thumbnails on the palette window 44 to paste data objects to the workspace window 50. As in this context, the term "using" is also understood to include such operation in which a thumbnail is selected and a resultant copy of the data object represented thereby is placed on the workspace window 50. As shown in FIG. 17*a*, the workspace window 50 has no existing data placed thereon. The palette window 44 has the exemplary callout box thumbnail 204 and the exemplary ellipse thumbnail 206, both of which can be clicked to select the respective thumbnail according to step 430.

According to one embodiment, the user may then navigate to a desired location within the workspace window 50 per step 440. The mouse button 38 can then be clicked, placing the exemplary ellipse 208 on the workspace window 50 as shown in FIG. 17*b*. It will be understood that the exemplary ellipse 208 is a copy in all respects, including dimension and other attributes, of an ellipse annotation originally copied and now represented by the exemplary ellipse thumbnail 206 as in step 450.

Figure 17C:
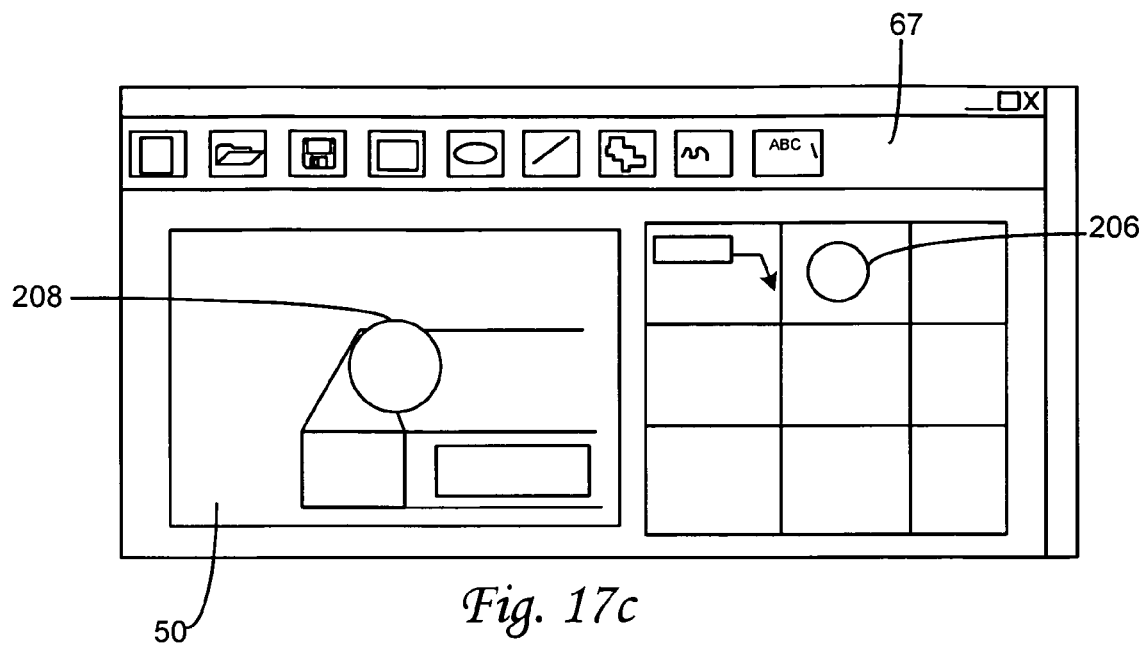
FIG. 17c illustrates a data object being placed in a central region of the workspace window after a selection of a corresponding thumbnail.
Figure 17D:
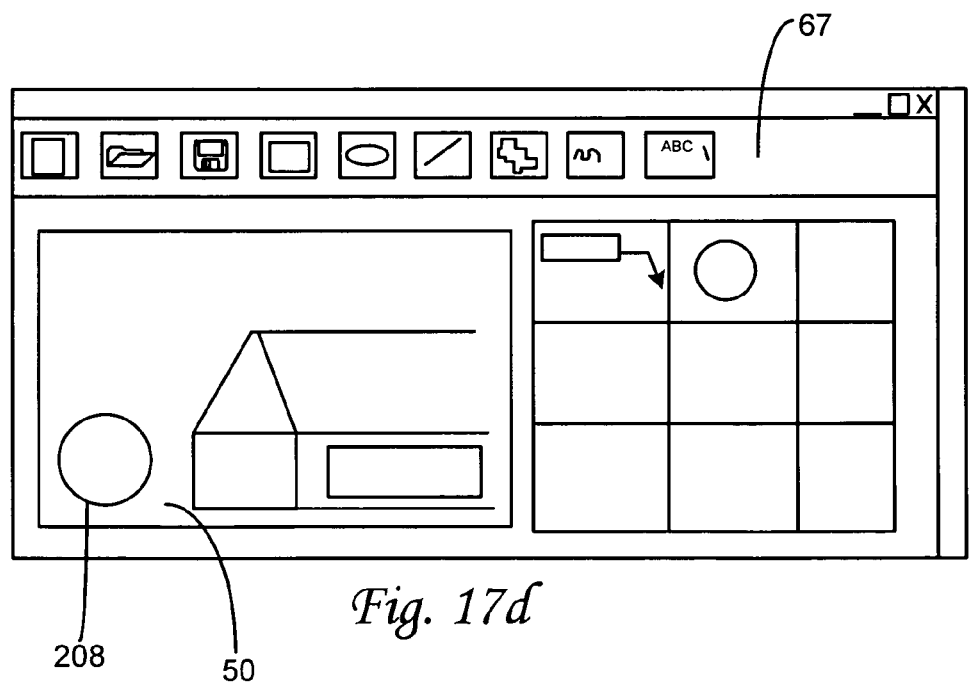
FIG. 17d illustrates another placement of a data object in the workspace window after a selection of a corresponding thumbnail.
Figure 18:
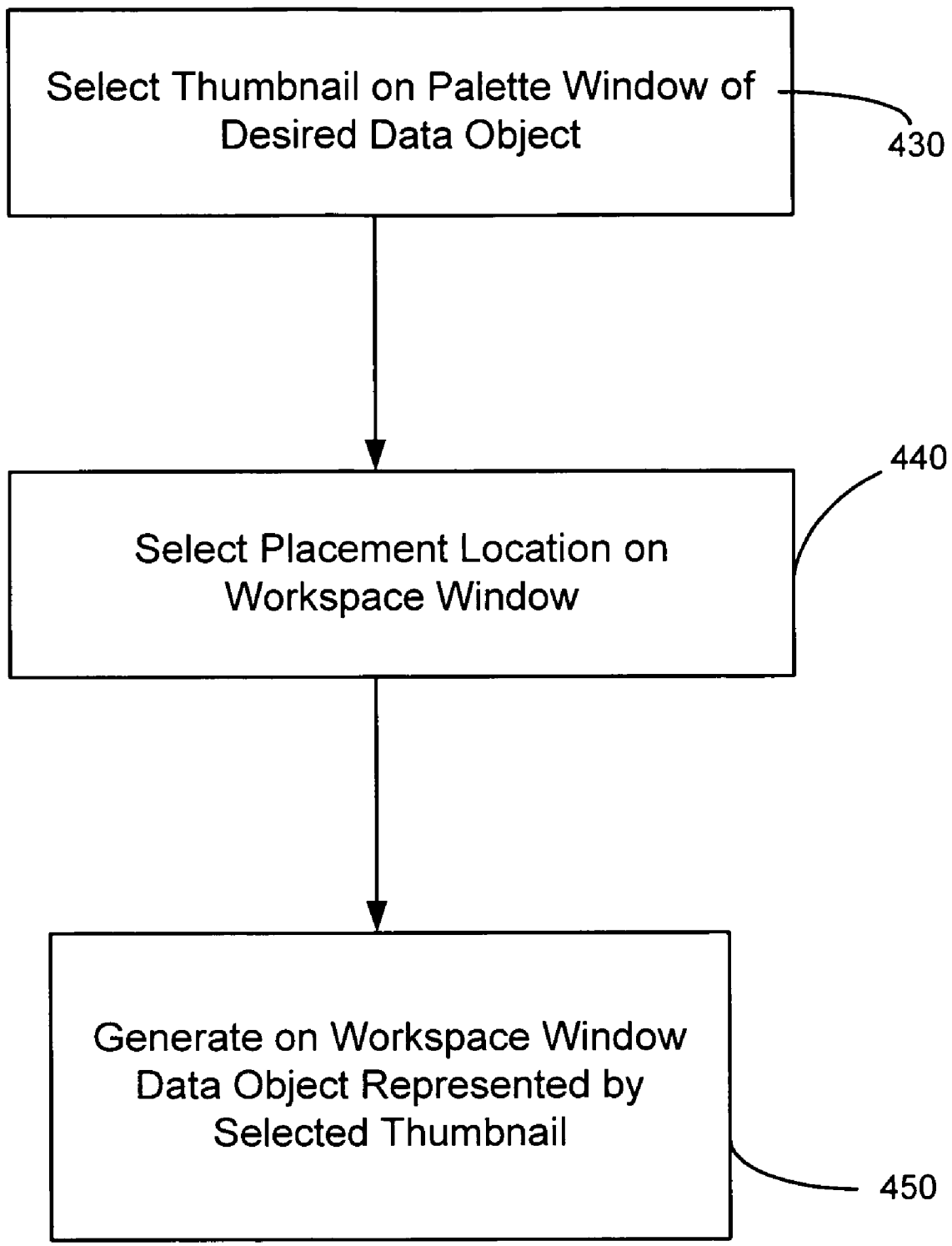
FIG. 18 is a flowchart illustrating the steps taken to place the data object on the workspace window by selecting the thumbnail on the palette window.

According to another embodiment as shown in FIG. 17*c*, the user may merely click on the ellipse thumbnail 206 and a copy of the exemplary ellipse 208 represented thereby may be automatically placed in the center region of the workspace window 50. The location of automatic placement may be varied, such as the lower left hand corner of the workspace window 50 as shown in FIG. 17*d*, without departing from the scope of the invention It is noted that in general when generating new data objects by selecting a given thumbnail, the cursor 36 may be modified to graphically represent the given thumbnail as being dragged to the desired location in the workspace window 50. In this regard, the mouse button 38 may be click to select the given thumbnail and continued to be depressed while navigating to the desired location where it is finally released. During such navigating, the dragged representation of the thumbnail would serve as a preview of the action to be implemented.

Upon placing the annotations on the workspace window 50, it is recognized that the immediately placed data object may already exist as it is already represented by a thumbnail in the palette window 44. Accordingly, a new thumbnail corresponding to such immediately placed data object will not be generated in palette window 44.

Figure 19A:
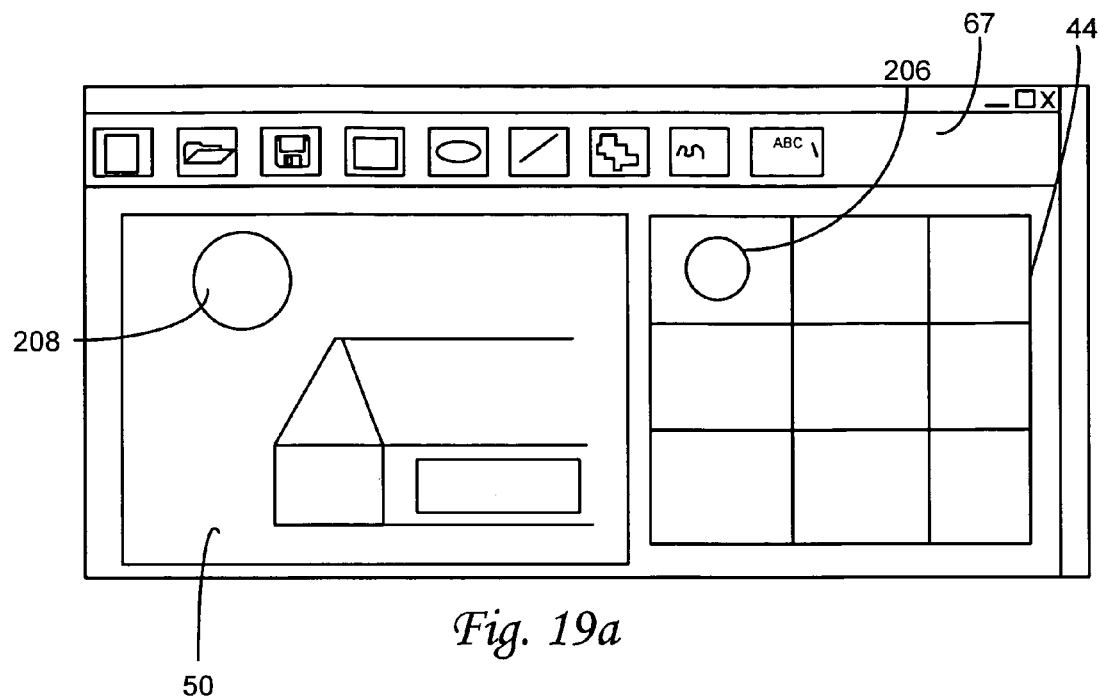
FIG. 19a illustrates a data object on a workspace window and a corresponding thumbnail on a palette window.
Figure 19B:
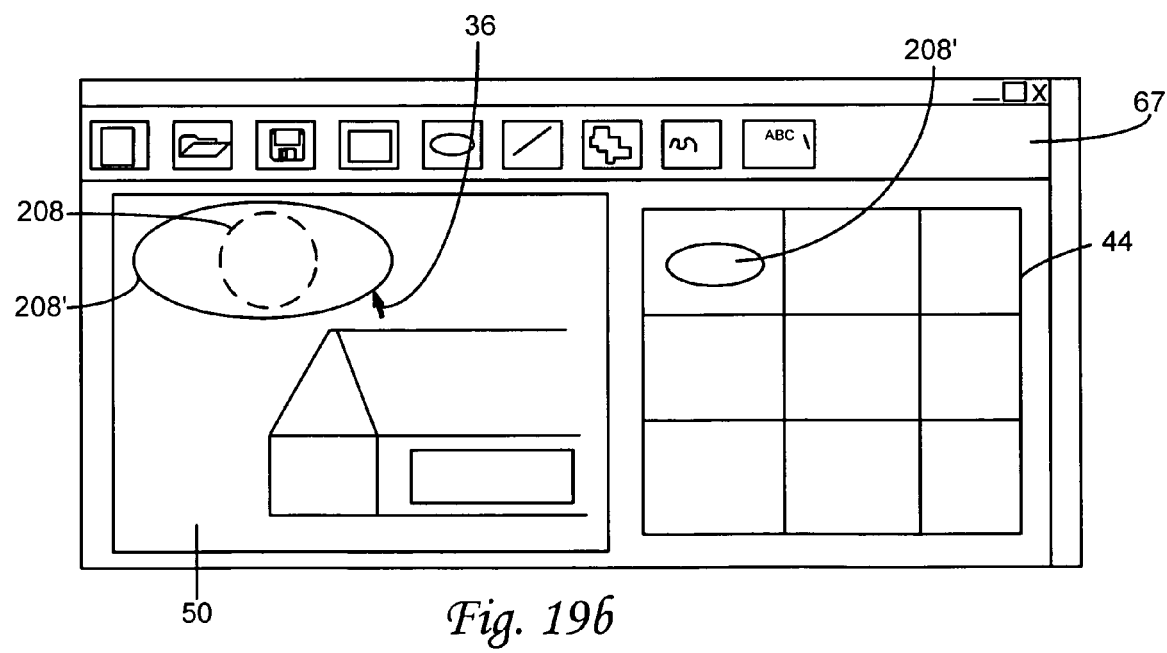
FIG. 19b illustrates the data object being modified on the workspace window and a corresponding thumbnail likewise being modified.
Figure 19C:
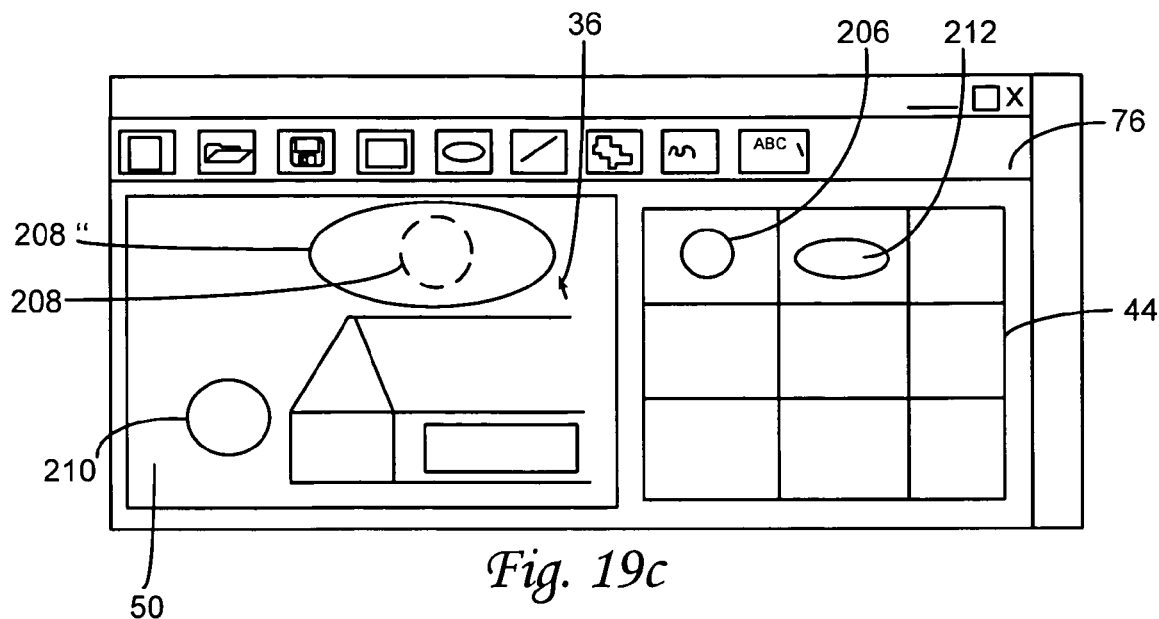
FIG. 19c illustrates another data object being modified on the workspace window and a corresponding thumbnail being generated on the palette window.
Figure 20:
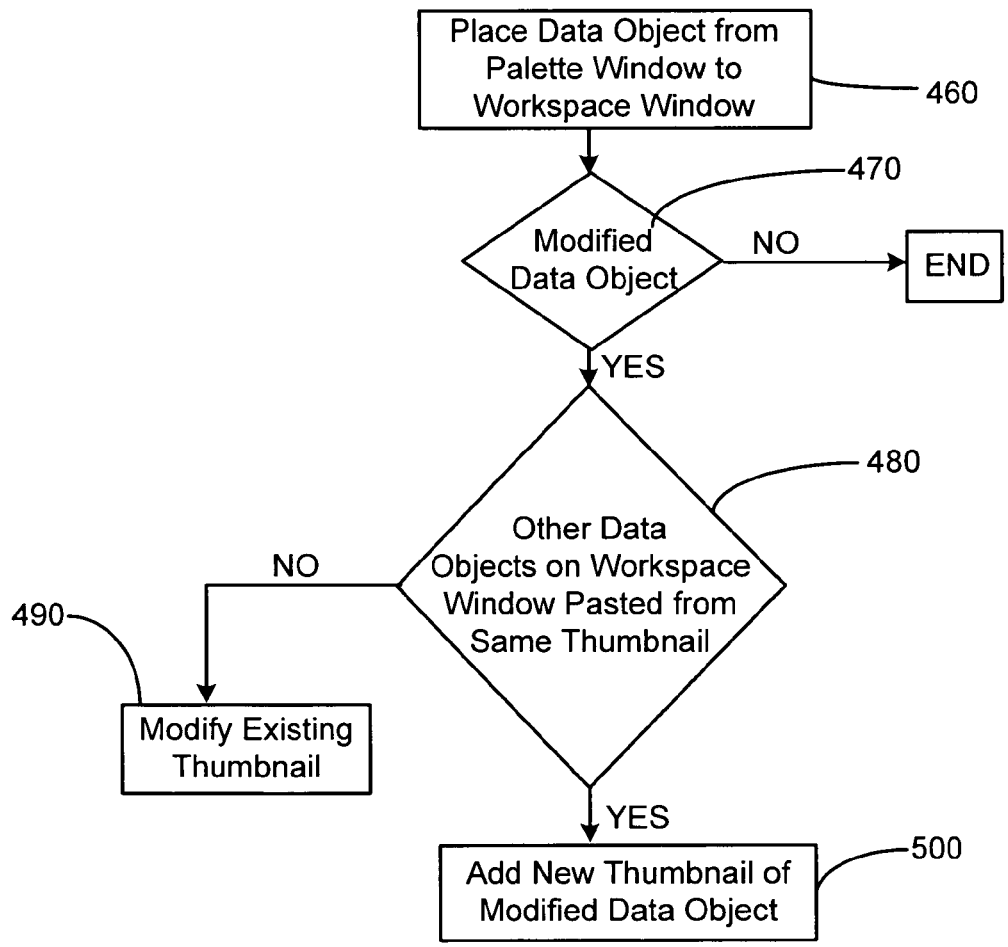
FIG. 20 is a flowchart describing the decisions made to determine whether to dynamically modify a thumbnail or to generate a new thumbnail.

With reference now to FIGS. 19*a*-*c* there is depicted views of the workspace window 50. FIG. 20 depicts a flowchart illustrating steps in the modification of an existing data object, in this case the exemplary ellipse 208, which is provided by way of example only, and its resulting effect on the palette window 44. In step 460, the exemplary ellipse 208 as shown in FIG. 19*a* (a copy of which is represented by the ellipse thumbnail 206) is placed on the workspace window 50. The exemplary ellipse 208 is in the form of a circle. The current state of the palette window 150 and the workspace window 50 is illustrated in FIG. 19*a*.

Further, in step 470, the exemplary ellipse 208 is modified as shown in FIG. 19*b* in accordance with the methods for modifying data objects as set forth above. The exemplary ellipse 208 (shown now in dashed lining) is modified to become a modified ellipse 208'. As the exemplary ellipse 208 is being modified, the changes may be immediately reflected in the exemplary ellipse thumbnail 206 into a modified ellipse thumbnail 206' as in step 490. This presupposes that it is determined in step 480 that there are no data objects currently existing on the workspace window 50 that resulted from selecting the exemplary ellipse thumbnail 206.

Referring now to FIG. 19*c*, there is depicted a secondary exemplary ellipse 210 generated from the ellipse thumbnail 206. There is also depicted an exemplary ellipse 208 (shown in dashed line) also generated from the ellipse thumbnail 206. In this embodiment, the user is shown to be in the process of just having completed modifying the exemplary ellipse 208 to a modified ellipse 208". In step 480 it was determined that other data objects such as the second exemplary ellipse 210 existed on workspace window 50 and placed as a result of selecting the exemplary ellipse thumbnail 206. Therefore, any modifications made, such as that resulting in the exemplary ellipse 208", generates a new ellipse thumbnail 212 is generated in the palette window 44 according to a step 500. Thus, a new tool becomes available to the user.

Figure 21A:
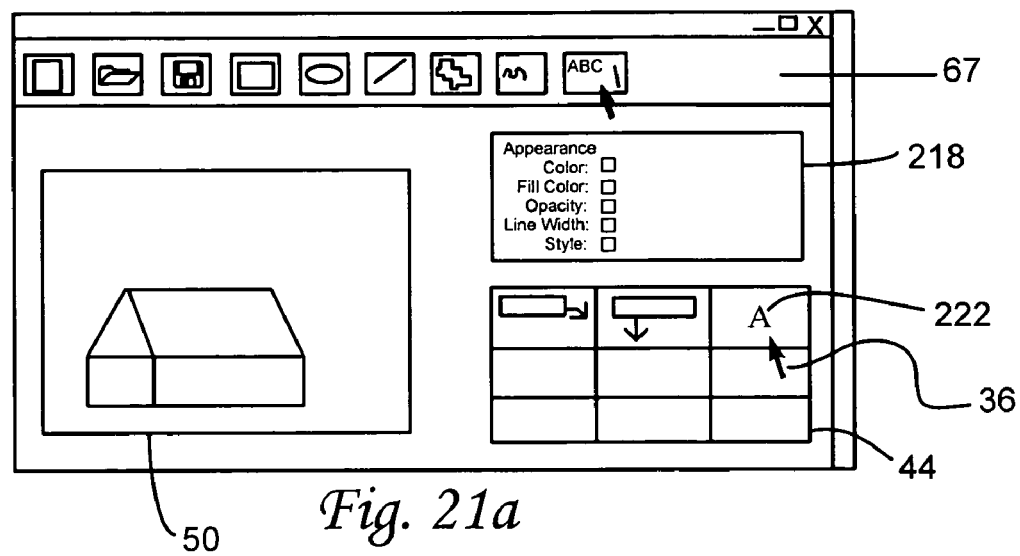
FIG. 21a illustrates a user selecting an icon on the palette in the drawing mode, where the workspace window has no data objects placed thereon.
Figure 21B:
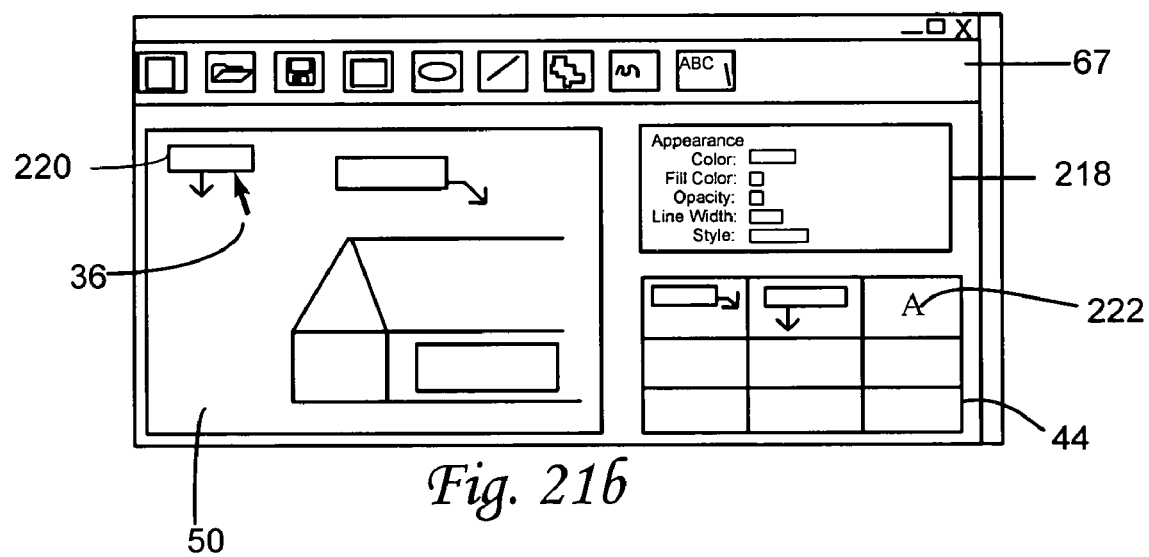
Figure 23:
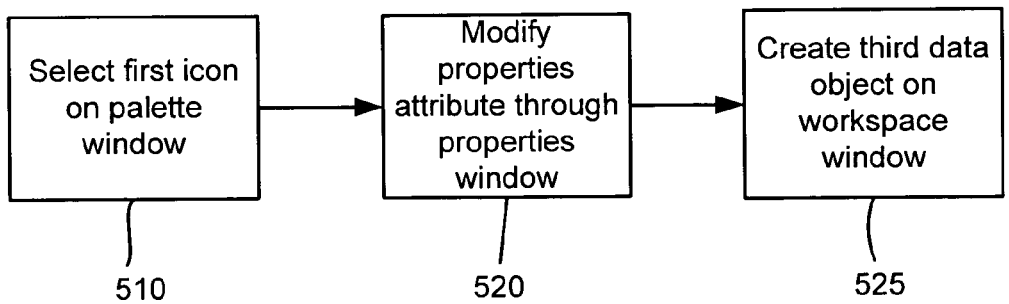
FIG. 23 is a flowchart describing the creation of a data object on the workspace window using the selected tool as illustrated in FIG. 21b.

Now, the various user interactions with respect to the palette window 44 in the properties mode will be considered. Referring to FIGS. 21*a*-21*b*, there is depicted a sequence of views of the workspace window 50. The flowchart of FIG. 23 illustrates the sequence of steps the user takes to create a third data object 220 on workspace window 50. In the step 510 as illustrated in FIG. 21*a*, the user selects a callout text icon 222 with the cursor 36 on the palette window 44. Then, in a step 520 the user modifies or confirms the properties 216 on properties window 218.

Figure 22:
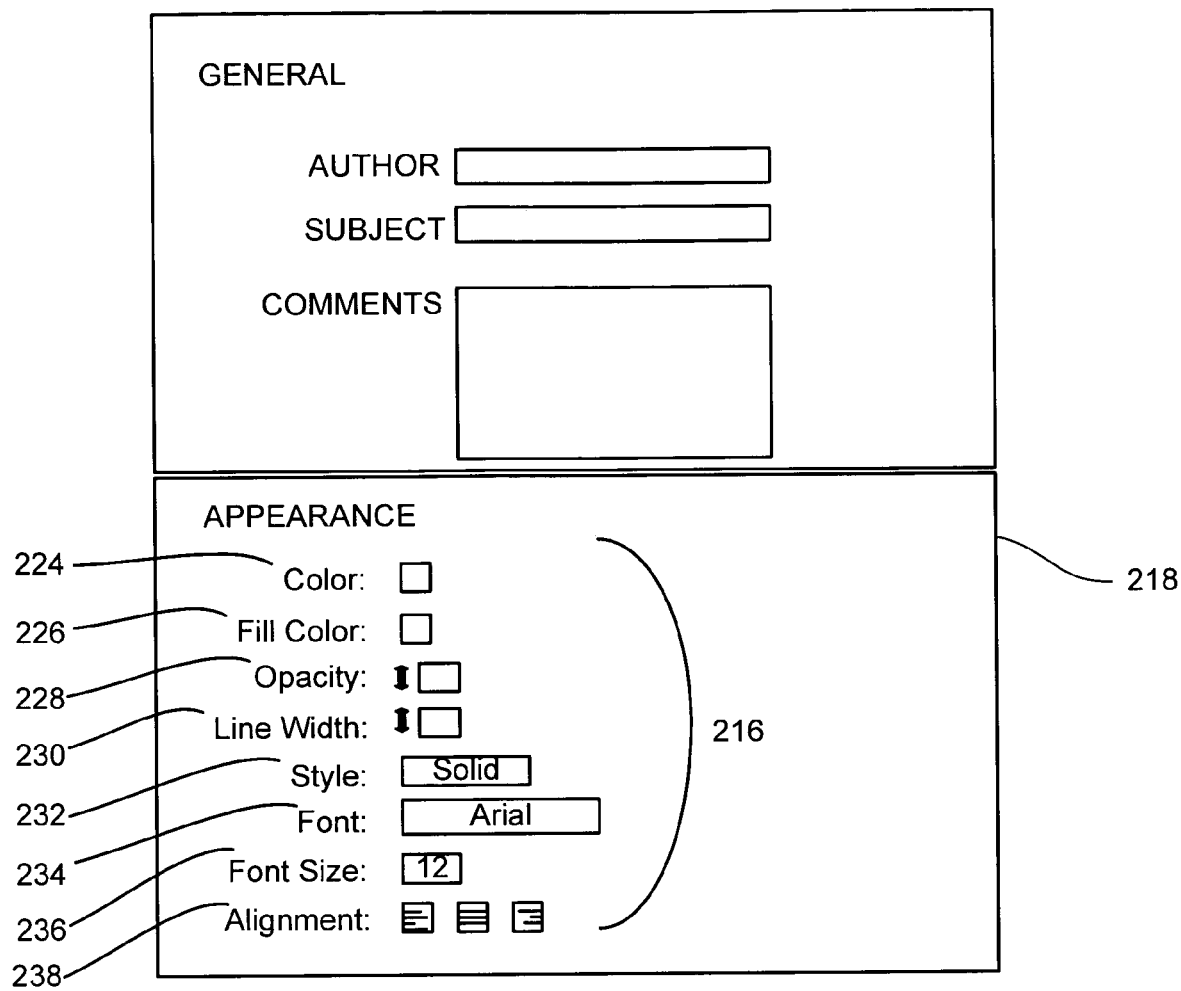
FIG. 22 is a detailed view of a properties window.

With regard to properties window 218, by way of example only and not of limitation, because the applicable tool is a callout text, properties 216 applicable only to such an entity is displayed. In this particular instance, as illustrated by FIG. 22, a color property 224, a fill color property 226, an opacity property 228, a line width property 230, a style property 232, a font property 234, a font size property 236, and an alignment property 238 are provided and editable according to techniques well known in the art. With reference to FIG. 6, the above properties are all stored in properties attribute 66.

Following the step 510, in a step 520, the user creates a third data object 220 on workspace window 50 in accordance with the techniques discussed above in relation to creating a new data objects by selecting a tool icon on tool bar 50 are likewise used in step the 524. As shown in FIG. 21*b*, the third data object 220 is created with property attributes as modified or confirmed in the step 520.

Figure 24A:
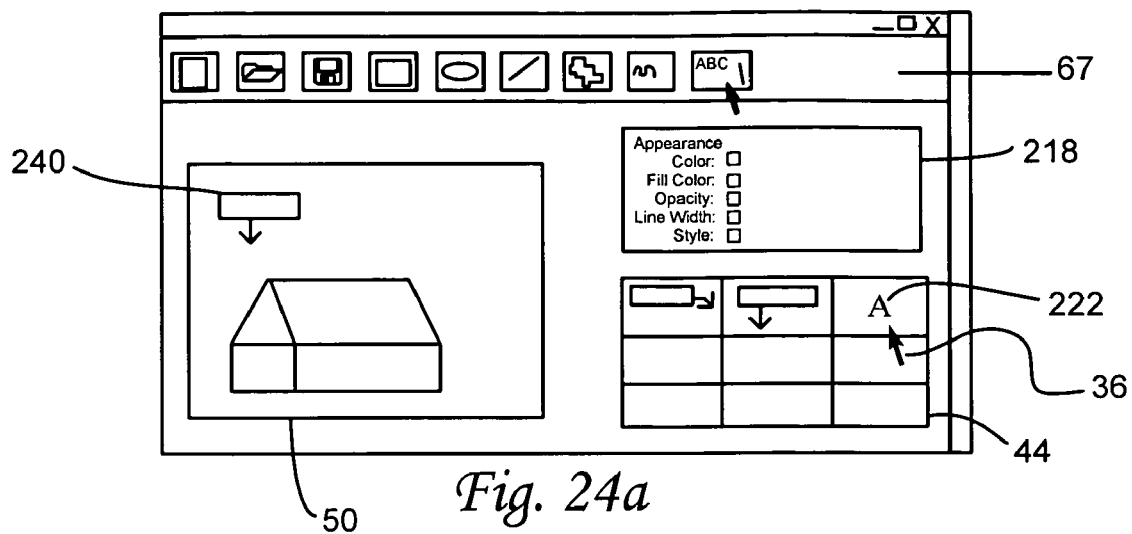
FIG. 24a illustrates the user selecting an icon on the palette window with the workspace window having a preexisting data object placed thereon.
Figure 24B:
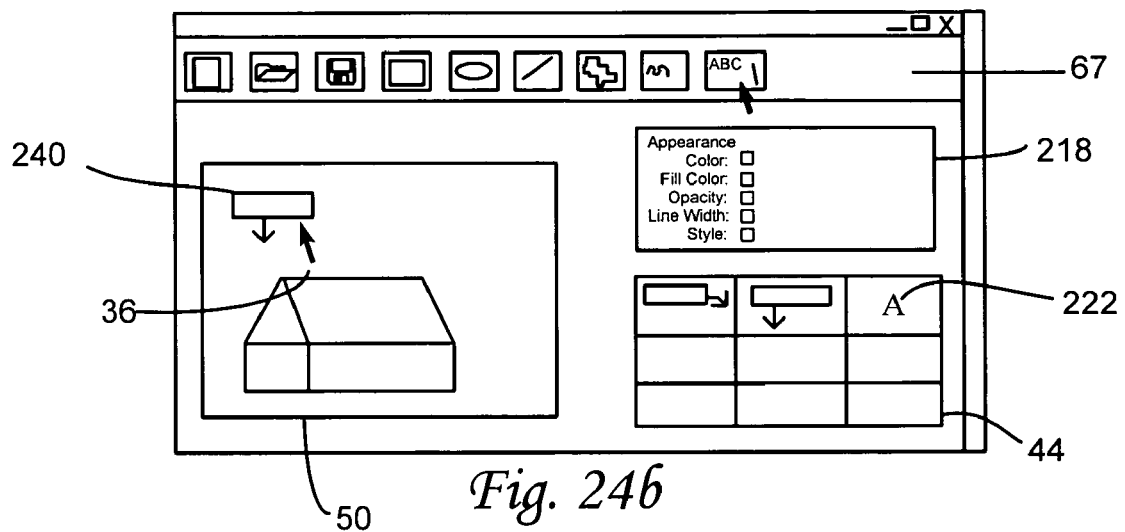
FIG. 24b illustrates the user selecting the preexisting data object after having selected an icon on the palette window.
Figure 24C:
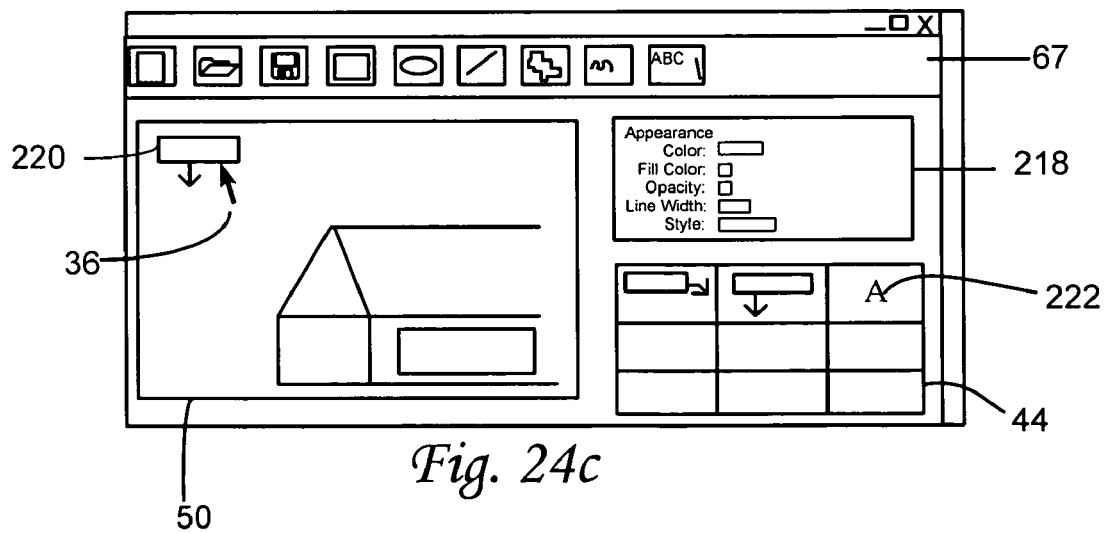
FIG. 24c illustrates properties of one data object being applied to the preexisting data object.
Figure 25:
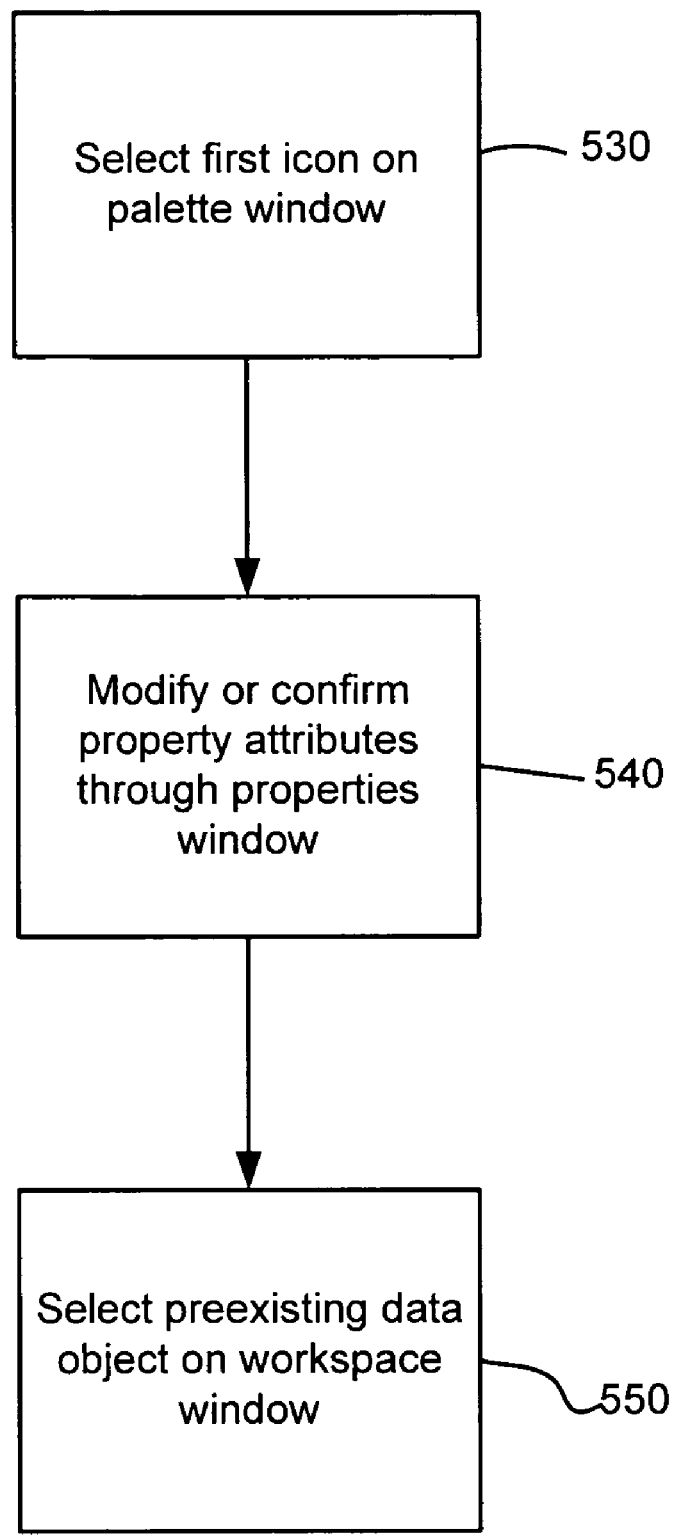
FIG. 25 is a flowchart describing the copying of property attributes from a selected icon to a preexisting data object.

While the aforementioned method for utilizing callout text icon 222 involved the creation of new data objects, referring now to FIGS. 24*a*-24*c*, the callout text icon 222 and other like icons may be utilized to copy the property attributes associated with the data object related to the callout text icon 222 to a preexisting data object 240. The flowchart of FIG. 25 illustrates the sequence of steps the user takes to modify the property attributes of the preexisting data object 240. As shown in FIG. 24*a,* prior to initiating the steps in accordance with the present invention, the workspace window 50 exists as illustrated with a preexisting data object 240 placed therein. By way of example only and not of limitation, the preexisting data object 240 includes a line width property 244 of "1".

According to step 530 and as illustrated in FIG. 24*a,* the user selects the callout text icon 222 with the cursor 36. Next, in step 540, the user modifies and/or confirms the properties attributes 216 as shown in FIG. 22. If the user modifies the line width property 230 to "3" instead of "1" as shown, after selecting the preexisting data object 240 with the cursor 36, the line width property 244 of the preexisting data object 240 will be modified to "3". A person of ordinary skill in the art will recognize that the tool of the icon selected from the palette window 44 need not be the same as the tool used to create the data object selected on workspace window 50. For example, properties associated with a data object created with a line tool can be copied to the properties associated with a data object created with a box tool. However, in such situations, only the common properties will be copied.

Figure 13:
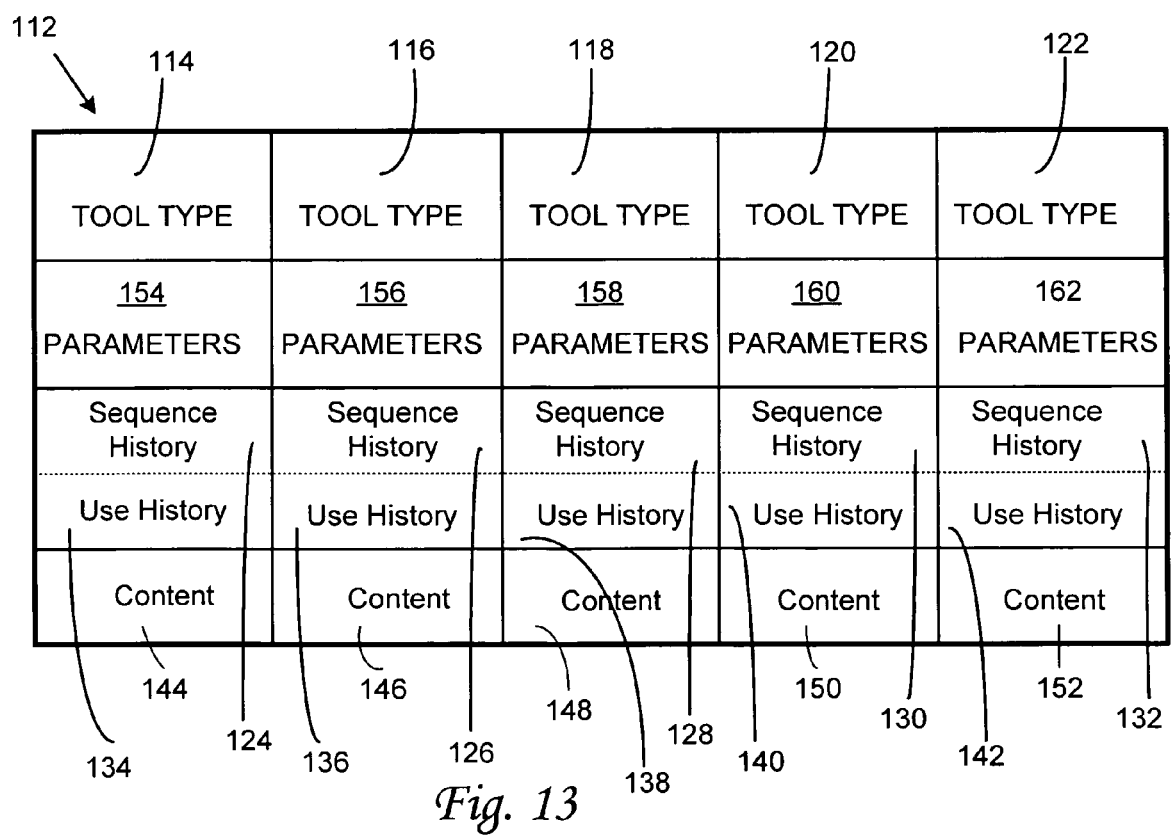
FIG. 13 is a block diagram of a palette memory having particular attributes in accordance with an aspect of the present invention.

For the purpose of displaying thumbnails or icons on the palette window 44 in the drawing mode or the properties mode, no distinction is made therebetween in grouping and sorting such items for displaying on palette window 44. For simplification, only thumbnails will be referred to, but it will be recognized by one of ordinary skill in the art that thumbnails may be readily replaced with icons without departing from the scope of the present invention. With reference to FIGS. 13 and 14, such grouping and sorting are carried out on the basis of the data objects stored in palette memory 112. As disclosed above, the palette window 44 has the individual cells 178, each containing a thumbnail of the data objects stored in the palette memory 112 or the icon of a tool corresponding to the respective tool type attribute of the data objects stored in palette memory 112. The individual cells 178 are organized into the rows 180, and the columns 182. With additional reference to FIG. 6, in organizing the rows 180 and the cells 178 contained therein, the tool type attribute 60 of each data object matching a particular tool such as pens, text, lines, shapes and advanced objects are collected and grouped. Those data objects stored in the palette memory 112 having the tool type attribute 60 of pens are retrieved, and the cells 178 in a top row of the palette window 44 are populated with a first pen thumbnail 220, a second pen thumbnail 222, and a third pen thumbnail 224, respectively. These thumbnails are generated from the retrieved data objects in accordance with the methods described above. In this manner, the other rows 180 of the cells 178 are populated. As a result, each of the data objects stored in the palette memory is grouped into rows according to the tool type attribute 60. These groupings are provided by way of example only and not of limitation, and grouping based on any of the attributes associated with the data objects stored in the palette memory are deemed to be within the scope of the invention.

As shown in the embodiment of FIG. 14, only three thumbnails can be displayed per row in the palette window 44. However, it should be noted that as described above, the number of thumbnails displayed may be altered by adjusting the size of the palette window. After grouping the annotations stored in the palette memory as set forth above, a determination must be made of which data objects are to be made available for access via the palette window 44. As set forth above, FIG. 13 illustrates an exemplary palette memory 112 which stores the first data object 114, the second data object 116, the third data object 118, the fourth data object 120, and the fifth data object 122. According to one embodiment, the first data object 114 includes a first sequence history attribute 124, the second data object 116 includes a second sequence history attribute 126, the third data object 118 includes a third sequence history attribute 128, the fourth data object 120 includes a fourth sequence history attribute 128, and the fifth data object 122 includes a fifth sequence history attribute 132. Each of the sequence history attributes stores the order in which the respective data object was stored into the palette memory 112.

For example, if the fifth data object 122 was stored before the fourth data object 120, then fifth sequence history attribute 132 would be indicated as a "1" while the fourth sequence history attribute 130 would be indicated as a "2." Furthermore, if the third data object 118 was stored after the fourth data object 120 as well as after the fifth data object 122, the third sequence history attribute 128 would be indicated as a "3," and so forth. Essentially, as new data objects are stored into the palette memory 112, the sequence history attribute of the data object immediately preceding it would be incremented by one and stored as the new sequence history attribute. It will be understood that upon storing each data object as described above, the sequence history of that data object is updated in this manner.

Figure 26:
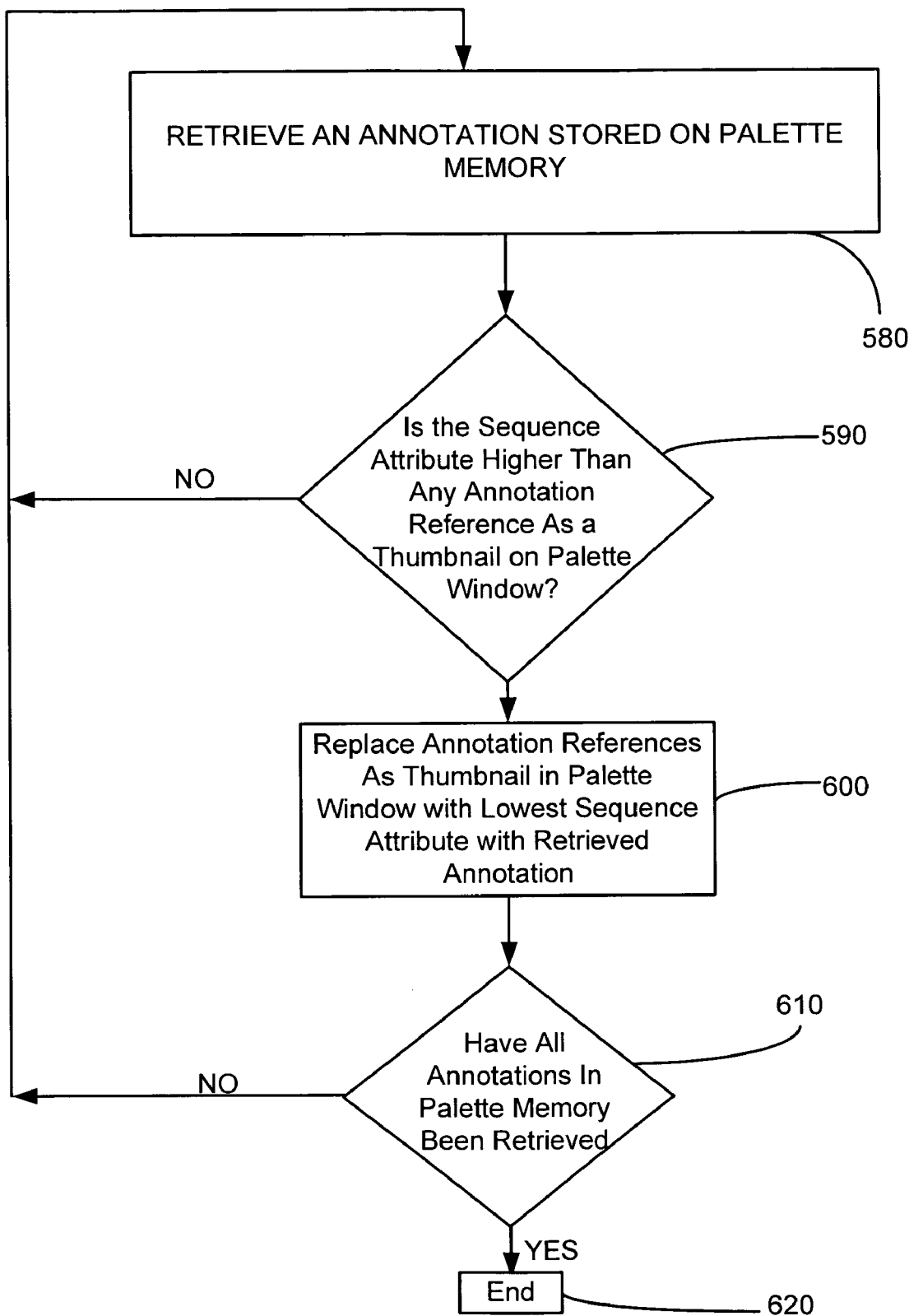
FIG. 26 is a flowchart illustrating the steps taken to organize thumbnails on a palette window in accordance with an aspect of the present invention.

With regard to the determination of which data object to display as a thumbnail in the palette window 44, in the example as set forth above where only three thumbnails are capable of being displayed, only the thumbnails of the data objects having the three highest sequence history attributes will be displayed. Continuing with the example, only the thumbnails of the first data object 114, the second data object 116, and the third data object 118 will be displayed. Thus, with reference to FIG. 26, in a step 580 a preexisting data object stored in the palette memory 112 is retrieved. Then, in accordance with a step 590, the sequence history attribute of the retrieved annotation is compared with the three, if any, annotations currently displayed as a thumbnail in the palette window 44. If the sequence history attribute of the retrieved data object is higher than that of any of the data objects currently being displayed as a thumbnail in the palette window 102, then the data object represented as a thumbnail in the palette window 44 with the lowest sequence attribute is replaced with the retrieved data object according to a step 600. Otherwise, the next data object is retrieved from the palette memory 112. In a step 610, if all of the data objects existing in the palette memory 112 have been processed in this manner, the procedure ends according to a step 620. If not, the next annotation is retrieved from the palette memory 112. According to an aspect of another embodiment, a particular data object may be locked into palette window 44, thus not being subjected to the aforementioned procedures. While reference has been made to a specific implementation, it will be appreciated by a person having ordinary skill in the art that it is provided by way of example only and not of limitation, and any other method for tracking one data object in relation to another is deemed to be within the scope of the invention.

Additional methods for determining which data objects to display as a thumbnail in the palette window 44 is contemplated as set forth in another embodiment which employs use history attributes 134, 136, 138, 140, and 142. It will be understood that after selecting a particular thumbnail and the corresponding data object is placed within the workspace window 50, the respective use history attribute is incremented. As an example, suppose the first data object 115 had been used fifty times, the second data object 116 had been used ten times, the third data object 118 had been used twice, and the fourth data object 120 had been use five times. Under these circumstances, the first use history attribute 134 will be equal to "50," the second use history attribute 136 will be equal to "10," the third use history attribute 138 will be equal to "2" and the fourth use history attribute 140 will be equal to "5." Only the most frequently used data objects will be represented in the palette window 102. Accordingly, if only three thumbnails may be displayed, the first data object 114 having the corresponding first use history attribute 124 of "50," the second data object 116 having the corresponding second use history attribute 126 of "10," and the fourth data object 120 having the corresponding fourth use history attribute 140 of "5" will be represented as thumbnails in the palette window 44. Furthermore, the thumbnails will be displayed in either ascending or descending order based upon the first, second, and fourth use history attributes 124, 126, and 130. It will be noted that despite third data object 118 being one of the three most recently used, the thumbnail associated with it will not be displayed because it has not been as frequently used as the others.

It will be further understood that in the preferred embodiment, the thumbnails displayed on palette window 102 will be determined in accordance with the application of the sequence history attributes 124, 126, 128, 130, and 132 as set forth above, and sorted within the palette window 44 according to the use of the history attributes 134, 136, 138, 140, and 142 also as set forth above. Additionally, it will be understood that in accordance with the preferred embodiment, all data objects used will be stored in the palette memory 112, with the most frequently used and the most recently used being represented as thumbnails in the palette window 44. In this regard, a library of such frequently used data objects can be developed, retrieved and used across different documents and user sessions.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show particulars of the present invention in more detail than is necessary for the fundamental understanding of the present invention, the description taken with the drawings making apparent to those skilled in the art how the several forms of the present invention may be embodied in practice.

What is claimed is:

1. A method for use with a graphical computer software application, the method comprising the steps of:
   generating a palette window having a drawing mode and a properties mode;
   generating on the palette window in the drawing mode a first thumbnail representative of a first data object having first attributes associated therewith, the first thumbnail being operative to initiate placement on a workspace window a second data object having second attributes copied from each of the first attributes; and
   generating on the palette window in the properties mode a first icon corresponding to the first data object and representative of a given one of the first attributes, the first icon being operative to initiate placement on the workspace window a third data object having third attributes derived from a limited subset of the first attributes excluding at least one of the first attributes.

2. The method as set forth in claim 1 wherein the first thumbnail is a scaled graphical representation of the first data object.

3. The method as set forth in claim 1 wherein the first data object represents text.

4. The method as set forth in claim 1 wherein the first data object represents a geometric primitive.

5. The method as set forth in claim 1 wherein the first data object represents a raster image.

6. The method as set forth in claim 1 further comprising the steps of:
   generating in the drawing mode other thumbnails representative of preexisting data objects having preexisting data object attributes associated therewith, the other thumbnails being generated on the palette window; and
   generating in the properties mode other icons representative of the preexisting data object attributes associated with the preexisting data objects, the other icons being generated on the palette window.

7. The method as set forth in claim 6 wherein a given one of the first attributes and a given one of the preexisting data object attributes of each of the data objects is a tool type attribute, the tool type attribute defining a type of tool used to create the associated data object.

8. The method as set forth in claim 7 wherein the first icon is representative of the first tool type attribute.

9. The method as set forth in claim 7 wherein the other icons are representative of the preexisting data object tool type attributes.

10. The method as set forth in claim 7 further comprising the step of:
    grouping the first thumbnail and the other thumbnails according to the tool type attribute of respective ones of data objects in the drawing mode of the palette window.

11. The method as set forth in claim 7 further comprising the step of:
    grouping the first icon and the other icons on the palette window according to the tool type attribute of respective ones of data objects in the properties mode of the palette window.

12. The method as set forth in claim 7 further comprising the step of:
    storing in a palette memory the first data object and the preexisting data objects.

13. The method as set forth in claim 7 wherein one of the first attributes is a first history attribute, and one of the preexisting data object attributes is a preexisting data object history attribute.

14. The method as set forth in claim 13 wherein the first history attribute and the preexisting data object history attributes are based upon a sequence of storing the associated data object in the palette memory in relation to the other data objects stored in the palette memory.

15. The method as set forth in claim 13 wherein the first history attribute and the preexisting data object history attributes are based upon a number of times the associated data object was placed on the workspace window.

16. The method as set forth in claim 13 further comprising the steps of:
    sorting the thumbnails according to the history attribute of the respective ones of the plurality of data objects.

17. The method as set forth in claim 13 further comprising the step of:
    sorting the icons according to the history attribute of the respective ones of the plurality of data objects.

18. The method as set forth in claim 13 further comprising the step of:
    storing in a palette memory the first data object and the preexisting data objects.

19. The method as set forth in claim 1 wherein a given one of the first attributes is a first parameters attribute defining dimensions of the first data object.

20. The method as set forth in claim 1 wherein a given one of first attributes is a first properties attribute defining graphical appearance of the first data object.

21. The method as set forth in claim 20 further comprising the step of:
generating a properties window in response to a selection of the icon, the properties window having a window element operative to modify the first properties attributes of the first data object.

22. The method as set forth in claim 1 wherein the first icon is operative to initiate the placement on the workspace window a third data object having third attributes derived from the first attributes.

23. The method as set forth in claim 1 wherein the first icon is operative to initiate the modification of preexisting attributes associated with a preexisting data object on the workspace window.

24. A method for using a graphical computer application, the method comprising the steps of:
selecting a first thumbnail on a palette window in a drawing mode, the thumbnail being representative of a first data object having a plurality of first attributes, the selection being operative to initiate placement of a second data object on a workspace window, the second data object having second attributes copied from each of the first attributes; and
selecting a first icon on the palette window in a properties mode, the first icon corresponding to the first data object and being representative of a given one of the first attributes, the selection of the first icon being operative to initiate placement of a third data object having third attributes on the workspace window, the third attributes being derived from a limited subset of the first attributes excluding at least one of the first attributes.

25. The method as set forth in claim 24 wherein the selection of the thumbnail results in a placement of the second data object in the workspace window.

26. The method as set forth in claim 25 wherein the second data object is placed in a central region of the workspace window.

27. The method as set forth in claim 24 further comprising the step of:
selecting a placement location within the workspace window for a second data object.

28. The method as set forth in claim 27 wherein the placement location is selected by positioning a cursor on the workspace window.

29. The method as set forth in claim 24 further comprising the step of:
modifying the second data object on the workspace window producing a modified second data object; and
selecting a thumbnail generated on the palette window in the drawing mode, the thumbnail being generated in response to modifying the second data object on the workspace window, wherein the thumbnail is a scaled representation of the modified second graphical data object.

30. The method as set forth in claim 24 further comprising the step of:
creating a third data object on the workspace window after selecting the icon on the palette window in the properties mode, the third data object having attributes derived from the first data object attributes.

31. The method as set forth in claim 30 wherein the third data object is created by positioning a cursor on the workspace window.

32. The method as set forth in claim 24 further comprising the step of:
selecting a preexisting data object having preexisting data object attributes on the workspace window after selecting the icon on the palette window in the properties mode, the selection being operative to initiate a modification to the preexisting data object attributes derived from the first data object attributes.

33. The method as set forth in claim 1, wherein only one of the third attributes is derived from the given one of the first attributes.

34. A method for use with a graphical computer software application, the method comprising the steps of:
generating a palette window having a drawing mode and a properties mode;
generating on the palette window in the drawing mode a first thumbnail representative of a first data object having first attributes associated therewith, the first thumbnail being operative to initiate placement on a workspace window a second data object having second attributes copied from each of the first attributes; and
generating on the palette window in the properties mode a first icon corresponding to the first data object and representative of a given one of the first attributes, the first icon being operative to initiate placement on the workspace window a third data object having third attributes subsequently modified from the first attributes.

* * * * *